(12) United States Patent
Cook

(10) Patent No.: US 8,396,810 B1
(45) Date of Patent: Mar. 12, 2013

(54) CENTRALIZED AUTHORIZATION AND FRAUD-PREVENTION SYSTEM INCLUDING VIRTUAL WALLET FOR NETWORK-BASED TRANSACTIONS

(75) Inventor: David P. Cook, Dallas, TX (US)

(73) Assignee: ZixIt Corporation, Dallas, TX (US)

( * ) Notice: Subject to any disclaimer, the term of this patent is extended or adjusted under 35 U.S.C. 154(b) by 2242 days.

(21) Appl. No.: 10/038,115

(22) Filed: Dec. 31, 2001

Related U.S. Application Data

(60) Provisional application No. 60/259,355, filed on Dec. 29, 2000.

(51) Int. Cl.
*G06Q 99/00* (2006.01)

(52) U.S. Cl. .......................................................... 705/67
(58) Field of Classification Search .................. 700/232; 705/41, 50–79
See application file for complete search history.

(56) References Cited

U.S. PATENT DOCUMENTS

| | | | | |
|---|---|---|---|---|
| 4,926,480 A | * | 5/1990 | Chaum | 705/69 |
| 5,638,445 A | * | 6/1997 | Spelman et al. | 705/77 |
| 5,878,140 A | * | 3/1999 | Chaum | 705/74 |
| 5,960,411 A | * | 9/1999 | Hartman et al. | 705/26.81 |
| 5,961,593 A | * | 10/1999 | Gabber et al. | 705/74 |
| 6,000,832 A | * | 12/1999 | Franklin et al. | 700/232 |
| 6,029,151 A | * | 2/2000 | Nikander | 705/78 |
| 6,108,644 A | * | 8/2000 | Goldschlag et al. | 705/69 |
| 6,327,578 B1 | * | 12/2001 | Linehan | 705/65 |
| 6,456,984 B1 | * | 9/2002 | Demoff et al. | 705/40 |
| 7,069,249 B2 | * | 6/2006 | Stolfo et al. | 705/74 |
| RE39,736 E | * | 7/2007 | Morrill, Jr. | 705/44 |
| 7,343,351 B1 | * | 3/2008 | Bishop et al. | 705/67 |
| 7,966,259 B1 | * | 6/2011 | Bui | 705/50 |
| 2001/0034725 A1 | * | 10/2001 | Park et al. | 705/79 |
| 2001/0044785 A1 | * | 11/2001 | Stolfo et al. | 705/74 |
| 2002/0004783 A1 | * | 1/2002 | Paltenghe et al. | 705/41 |
| 2002/0065774 A1 | * | 5/2002 | Young et al. | 705/41 |
| 2002/0194139 A1 | * | 12/2002 | Kianian | 705/65 |
| 2003/0220841 A1 | * | 11/2003 | Maritzen | 705/26 |

FOREIGN PATENT DOCUMENTS

| | | |
|---|---|---|
| EP | 001168264 A2 * | 1/2002 |
| WO | WO01/41419 A1 * | 6/2001 |

OTHER PUBLICATIONS

Wrona et al. ("Mobile Payments—State of the Art and Open Problems", Springer-Verlag Berlin Heidelberg, 2001, pp. 88-100, WELCOM 2001).*

* cited by examiner

*Primary Examiner* — James D Nigh
(74) *Attorney, Agent, or Firm* — Fish & Richardson P.C.

(57) ABSTRACT

A system and method for authorizing certain aspects of network based transactions between a customer and a merchant is disclosed.

18 Claims, 19 Drawing Sheets

↙ 75

| Entry | Payment Alias 200 | Account ID 202 | Exp. Date 203 | Acct. Name 204 | Bill Add. 206 | Contact Item 208 | Notification Item 210 | Default Sel. Item 212 |
|---|---|---|---|---|---|---|---|---|
| E1 | Mary's Visa | 123-xxx | 10/02 | M Jones | Add 1 | 650-2334 | all | yes |
| E2 | My Amex | 234-xxx | 10/02 | M Smith | Add 2 | MS@aol | none | no |
| E3 | Corp. Card | 456-xxx | 10/03 | M Wels | Add 3 | 344-3456 | all | yes |

US 8,396,810 B1

CENTRALIZED AUTHORIZATION AND FRAUD-PREVENTION SYSTEM INCLUDING VIRTUAL WALLET FOR NETWORK-BASED TRANSACTIONS

CROSS-REFERENCE TO RELATED APPLICATIONS

This application claims the benefit of prior U.S. Provisional Patent Application No. 60/259,355, filed Dec. 29, 2000, the specification of which is incorporated by reference.

TECHNICAL FIELD

This invention relates generally to electronic commerce and, more particularly, to a system and method for authorizing certain aspects of network based transactions.

BACKGROUND

There are many emerging trends in the communications world, including the increase in network technology and the proliferation of data networks. These trends have advanced the proliferation of e-commerce, i.e., commerce that occurs over an electronic network such as the Internet. E-commerce enables certain customers to purchase goods and services using an account number by contacting a merchant directly over an electronic network. Common e-commerce scenarios include a person at home using a credit card to purchase a product from an on-line store over the Internet, and an employee of a corporation acting as a buyer/authorizer for acquiring resources using a company issued account number.

Numerous differences exist between e-commerce and face-to face transactions. In an e-commerce transaction a customer cannot physically present a payment option (e.g., charge card, debit card) to a merchant. For example, in a conventional face-to-face transaction, a customer selects and presents a charge card to a merchant at the time for check out. The charge card includes various information including account number, expiration date, and may include an account code which may be verified by the merchant to ensure that the party presenting the charge card is authorized to make purchases on an associated account.

In an e-commerce transaction, three problems arise for the customer, one in the selection of a payment option, one in the transmission of information to the merchant and one in the possible compromise of information after transmission to the merchant. First as to the transmission problem, because there is no physical presentation of a payment option, the customer must rely on a network as the medium for transferring the authorizing information (account number, expiration date, billing information, account code etc.) to the merchant. Some customers are less likely to utilize e-commerce because of a perceived security inadequacy in transmission of their confidential information.

Even overcoming the fear of transmission, customers are also less likely to utilize e-commerce if the transaction is difficult to complete or requires too much time. Unlike the face-to-face transactions where a customer merely presents a payment option (e.g., hands a clerk a charge card), e-commerce transactions require authorization information to be produced and transferred at each transaction. The amount of information that has to be transferred at each transaction is not insubstantial. If the customer is required to manually enter the information at each transaction, then customers are less likely to utilize e-commerce. One solution is an electronic wallet that can be used to store payment information in a database so that the customer is not required to manually enter such at each transaction. However, much as with the transmission fear discussed above, many customers are unwilling to store such information in a database fearing the potential for unauthorized access and use of the confidential information.

Furthermore, in an e-commerce transaction a customer cannot physically "sign" a completed sales event. For example, in face-to-face transactions, a customer is typically given an authorization form such as a paper charge slip, with a final charge amount printed thereon. The customer then physically signs a name on the slip, thereby authorizing the transaction. However, equivalent "signing" procedures for e-commerce transactions are not currently generally available.

For these and other reasons, it is common that account issuers and/or conventional authorization and fraud detection systems will not guarantee payment for e-commerce transactions. As a result, the merchant is often left with the financial loss that occurs when an account number has been fraudulently used in the transaction.

SUMMARY

In one aspect, the invention provides a system for authorizing a transaction between a customer and an e-commerce merchant. The system includes a server wallet including payment options each payment option including personal payment information associated with the customer and a proxy for processing a transaction on behalf of the merchant using a payment option designated by a customer and included in the server wallet. The proxy processes the transaction and returns to the merchant a transaction approval without transferring any of the personal payment information associated with the customer to the merchant.

Aspects of the invention can include one or more of the following advantages. A system and method are provided to help prevent, reduce, and/or eliminate fraudulent acquisition of customer account information used for e-commerce transactions. The system can help to authorize customer account information and prevent fraudulent use of customer account information. The merchant in an e-commerce transaction can authorize the transaction in a relatively simple manner. The method is relatively easy to implement by both the customer and the merchant, and does not require an excessive amount of keystrokes or actions for any single transaction, nor does it require specialized client software.

A system is provided that helps to organize and securely store customer confidential payment information and allows the customer to quickly and easily select from plural payment options at the time for checkout in an e-commerce transaction. E-commerce transactions can be authorized by proxy, allowing the proxy to authorize transactions on behalf of the merchant without directly providing to the merchant account or other customer information that could be compromised. The storage and transmission of confidential payment information is accomplished using secure means. The selection of payment options is easy to accomplish while maintaining the security of the underlying confidential information.

A distributed real-time software application (referred to herein as "ZixCharge") is provided that allows consumers to authorize transactions in a secure, private, and convenient manner for the purchase of goods and services over the Internet. The system allows consumers to complete purchase transactions without merchants obtaining personal and charge card information from the consumer. A "wallet" is provided in which a consumer can register information for one or more credit cards, accounts etc., thereby allowing the consumer can choose between different, secure payment options. ZixCharge transactions have three major participants: consumers, merchants and charge card issuers. Each of the participants benefits from the use of ZixCharge.

Consumers benefit by having personal and credit card information, and purchasing histories kept confidential. Since fewer web sites have the consumer's information, there is less chance of their identities or their credit cards being used by others. Consumers also have the convenience of only having to digitally "sign" a charge slip in order to complete a purchase.

Merchants benefit by realizing a dramatic reduction in fraudulent transactions. The reduction can be attributed to the use of digital signatures on charge slips, which positively identify a party to a transaction. Merchants accepting ZixCharge transactions will have access to large numbers of Internet consumers who are members of the ZixCharge system, including consumers who currently avoid Internet shopping due to security concerns.

Card issuers benefit in numerous ways. Using the ZixCharge system, card issuers can control the dissemination (and abuse) of cardholder information and foster brand loyalty and goodwill with consumers. These types of features can be used by card issuers to differentiate the card issuers' cards from the competition allowing the card issuers to retain existing and obtain new cardholders. In addition, card issuers can re-enforce their identity with prominent logo placement (display) throughout the purchase process. Virtual debit cards can be issued for checking accounts, lines of credit and other types of accounts. A more secure communication with cardholders can be accomplished, in particular regarding purchases, unusual activity and account changes using an electronic mail service (herein referred to as "ZixMail"). Finally, card issuers can realize new revenue from ZixCharge fees. These and other advantages will be readily apparent from the description below.

These and other advantages will be apparent upon examination of the detailed description and claims presented below along with the accompanying drawings.

DETAILED DESCRIPTION

Figure 1:
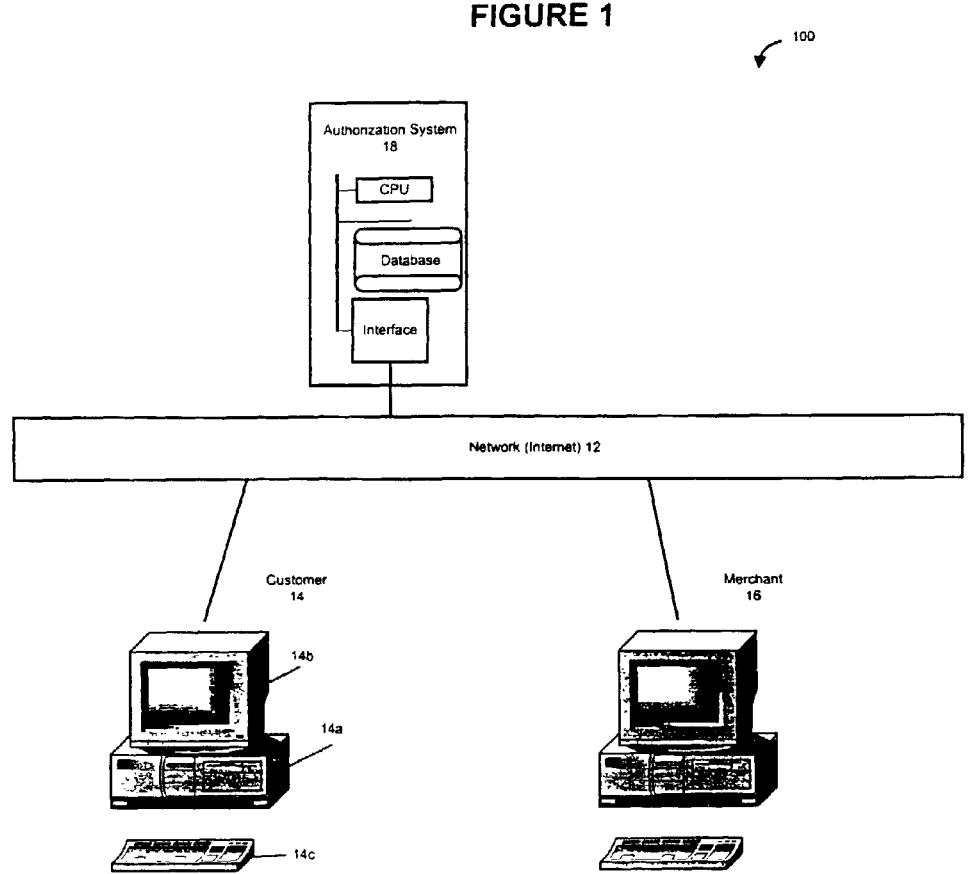
FIG. 1 is a diagram of a network and several nodes for implementing one implementation of the present invention.

The present invention provides a unique system and method for authorizing certain aspects of network based transactions. It is understood that the following disclosure provides many different implementations, or examples, for implementing different features. Techniques and requirements that are only specific to certain implementations should not be imported into other implementations. Also, specific examples of networks, components, and formats are described below to simplify the present disclosure. These are, of course, merely examples and are not intended to limit the invention from that described in the claims.

A distributed real-time software application (referred to herein as "ZixCharge") is provided, which allows consumers to authorize transactions in a secure, private, and convenient manner for the purchase of goods and services over the Internet. The major architectural features of the ZixCharge system include a central repository of consumer data, a personal "wallet" (referred to herein as ZixWallet) which is stored in the central repository, a charge slip user interface, ZixCharge application processing interface (hereinafter, ZAPI) for a web site, a centralized approval service, (optionally) a signature server and Internet shopping mall (referred to herein as "ZixMall").

The ZixCharge system provides a central repository of consumer charge card information. Each consumer's information is stored in a ZixWallet and only needs to be entered once. Every ZixWallet is protected by a login name and a password (i.e., entry phrase) known only to the consumer who is associated with the ZixWallet. The login name and password are required to open the ZixWallet and to authorize charges by one or more accounts for which information has been entered in the ZixWallet. The ZixWallet interface will be described in further detail below.

The ZixCharge system provides a charge slip interface that allows a consumer to digitally sign for a purchase—just as the consumer would do in a retail store. The charge slip can be initiated by the merchant site, and can include the merchant logo, detailed purchase information, merchant advertising, and other information. The charge slip interface can be used by a consumer to select a payment type from the available payment types in his or her ZixWallet (such as charge card, checking account, or other methods that may be available in the ZixWallet), shipping address options, and a method for merchant communications regarding the purchase. Once digitally signed, the charge slip information, including a certified time-stamp, is returned to the merchant web site, but the charge slip cannot be opened or read there. The charge slip is fully encrypted so that only the ZixCharge central repository can read the charge slip. The charge slip will be described in further detail below.

The ZixCharge system includes a merchant to consumer interface, ZAPI, residing on the merchant Web site. ZAPI provides all communication services between the merchant and the consumer during the charge slip portion of an authorization, and between the merchant and the central repository. After a transaction is approved, ZAPI provides the merchant with approval and shipping information. The merchant system can complete the transaction and fulfillment just as if the approval had been obtained directly by the merchant. ZAPI also ensures the transaction's validity. ZAPI combines three items, a certified time-stamp, the "hash" of the charge slip information and the returned encrypted charge slip from the consumer. ZAPI digitally signs the combination with the merchant's digital signature before sending the transaction to the central repository.

The ZixCharge system provides charge approval services at the central repository. All incoming charge slips are decrypted, validated by the previously mentioned "hash," and authenticated by verifying the digital signatures of both the merchant and the consumer. The central repository formats an authorization message containing the required information to obtain a charge card authorization on behalf of both the consumer and the merchant and then forwards the message to a charge card processor, normally over dedicated communication lines. Upon receiving approval, or not, for the authorization, the central repository sends the authorization information back to ZAPI at the merchant web site. If a successful authorization has been obtained, the returned information will include any consumer authorized shipping information. E-mail communications for any transaction specific information is normally sent to the central repository and then forwarded to the consumer. The ZixCharge system allows the consumer to keep their respective E-mail address private. The merchant is also given a ZixCharge member ID. The ZixCharge member ID enables the merchant to aggregate transactions for marketing purposes and to communicate with the consumer through the ID, but still protects the consumer's actual identity. The consumer can optionally block the forwarding of messages sent to the member ID.

The ZixCharge system can utilize a worldwide signature server (central key server). The central key server can be distributed and allows the ZixCharge system to instantly authenticate both the merchant and the consumer in a transaction. The central key server further ensures that a given digital signature has not been revoked, suspended, changed or deleted. The central signature server also can respond to requests for and issue certified time-stamps. The time-stamp certificate can be self-authenticated (authenticated by at least one signature whose public key is known) and is impossible to tamper with or change. The time stamp certificate provides further authentication and validation.

The ZixCharge system can include an optional Internet shopping portal (referred to hereafter as "ZixMall"). Merchants who accept payment, or allow other types of transaction authorizations, using the ZixCharge system, may be listed in the ZixMall. When consumers shop through the ZixMall, they are assured that the merchant respects their privacy and is willing to sell merchandise or services without collecting unnecessary personal information. No charge card billing information is given to the merchant and the ZixCharge e-mail forwarding service can be used to protect the customers' real e-mail addresses.

A number of terms are used herein to describe transaction authorization systems and related entities.

"Consumer" or "Member" refers to the role that is played by anyone who shops for goods or services from merchants and uses the ZixCharge payment system to authorize the resulting purchases. A consumer or member has typically activated a ZixWallet.

"Merchant" refers to an organization that sells goods and/or services to members using the ZixCharge payment system, or to a web site that performs hosted computing services on behalf of a merchant in the pursuit of e-commerce.

"Affiliate" as used herein, refers to an organization that is affiliated with the ZixCharge payment system. Affiliates include sponsors and merchants. "Sponsor" refers to an organization that provides member information (i.e., E-mail address and credit card information). Sponsors include financial institutions or other organizations that issue charge cards.

"Internet Service Provider" (ISP) refers to an organization that provides Internet access. An ISP can be a Sponsor.

"Authorization Processor" or "Card Processor" refers to one of the organizations used by the ZixCharge payment system to authorize card purchases. Different merchants can use different card processors. An authorization processor is an affiliate.

"Transaction" refers to an interaction or exchange between a merchant and a consumer. Typically, a transaction is conducted remotely, that is, using a medium such as the Internet to execute the transaction. As such, the parties to the transaction must be able to be authenticated to ensure the integrity of the transaction. A transaction can include the purchase of goods or services from the merchant, and require payment by the consumer. Other types of transactions can also be authorized using the methods disclosed herein.

"Shipping address" refers to a destination for delivery of goods or services for a transaction. The delivery can be made to a home address, an E-mail address, a URL or an IP address. In some transactions, no delivery is required, and as such the designation of a shipping address may not be required.

"Account number" refers to a number that identifies a specific account from an account issuer. One example of an account number is a credit card number issued from a bank or other financial entity. Another example is a corporate charge account number provided by a corporation. Additional examples of account numbers include debit card numbers, organizational card numbers, membership identification numbers, social security numbers, e-mail addresses, and the like.

"Payment Option" is a term used in the following disclosure to indicate a form of payment to be used by a customer in an e-commerce transaction. Payment options include charge card, debit card, organizational card, membership identification card, line of credit, checking, saving and money market accounts, and the like.

"Virtual wallet" is a term used in the following disclosure to indicate a collection of customer payment options. A virtual wallet can have one or more entries, each a record of information associated with a particular payment option.

"Entry Phrase" is a term used in the following disclosure to indicate a phrase associated with a particular virtual wallet. In one implementation, the entry phrase is created either by the user/owner of a virtual wallet or by the wallet issuer.

"Wallet E-mail Address" is a term used in the following disclosure to designate an E-mail address to be associated with a particular virtual wallet. The E-mail address along with the entry phrase can be used to establish ownership of a particular virtual wallet, allowing the owner to authorize a transaction or modify a database entry in the virtual wallet.

Exemplary Network

Referring now to FIG. 1 of the drawings, the reference numeral 10 designates, in general, a system for implementing electronic commerce (e-commerce). The system 10 is centered around a network 12, which may be any combination of the Internet, local area networks, and Intranets. For the sake of example, the network 12 will be considered to be the Internet and will utilize Transfer Control Protocol/Internet Protocol (TCP/IP) to transmit data between various nodes connected to the network. Communication techniques such as Secure Sockets Layer (SSL) or Secure HyperText Transmission Protocol (HTTPS) can be used to provide extra security for Internet transactions.

Three nodes 14, 16, and 18 are illustrated as being attached to the network 12. The nodes 14-18 are illustrated as personal computers, but it is understood that each node can actually represent one or more different computing devices, including mainframes, servers, wireless telephones, personal digital assistants, and the like.

Referring to node 14 for example, the node includes a processing unit, a memory, and a network interface, generally represented as computer 14a. The computer 14a also includes a customer interface, which in the present example includes a monitor 14b and keyboard 14c. It is understood that each of the listed components may actually represent several different components. For example, the computer 14a may actually represent a distributed processing system including different levels of main memory, hard disks, server/client memory, and remote storage locations. Furthermore, it is understood that, in many implementations, the nodes 14, 16, and 18 may be configured differently from each other and/or may have different components.

In the present example, node 14 (hereinafter customer 14) will represent an e-commerce customer who wishes to purchase an item or to otherwise authorize a transaction, and node 16 (hereinafter merchant 16) will represent an e-commerce merchant willing to sell the item or complete the transaction. Node 18 (hereinafter authorization system 18) will represent an authorization system that will facilitate the transaction between the customer 14 and the merchant 16.

In the present example, before a transaction is completed, one or more preliminary steps may be performed pertaining to the authorization system 18.

A customer 14 can create a virtual wallet that points to entries stored in a database associated with authorization system 18. Each entry in the database is a record for a payment option and includes account number and other related information. In one example, account issuers furnish account numbers and other related information to the authorization system 18. In another example, the customer 14 may furnish an account number and other related information, either before initiating a transaction or during the transaction.

The authorization system database can be used by authorization system 18 to approve transactions. That is, the authorization system 18 can increase the reliability of an e-commerce transaction further by requiring that certain additional checks be made with regard to the transaction, the customer 14 and, or the merchant 16. Virtual wallet(s) and the database can be co-located within authorization system 18, or can be separate.

Customer 14 can complete an e-commerce transaction by invoking the virtual wallet and selecting a payment option. Authorization system 18 obtains an approval code for the e-commerce transaction and returns a certificate to the merchant 16 containing information such as date, time, approval code and transaction information. The certificate is normally digitally signed by authorization system 18. In this way, the customer 14 can complete the transaction without providing any confidential information to the merchant 16 during the authorization process, yet the merchant 16 can obtain an appropriate approval code for the transaction.

The completion of the transaction may also include one or more certification processes for further authentication. Both the transaction completion and the certification processes are individually discussed in greater detail below. It is understood, however, that different implementations may utilize some steps while not utilizing others. Furthermore, a wide range of modifications, changes and substitutions are intended in the following disclosure.

The Virtual Wallet and Database

Figures 2, 3:
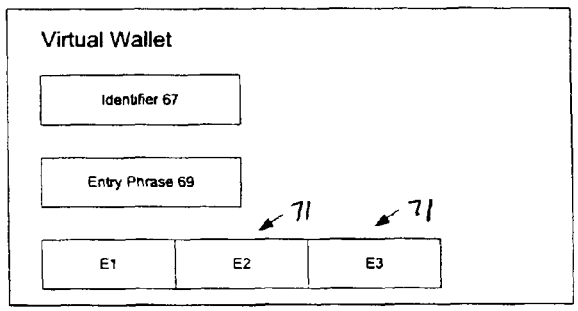
FIGS. 2 and 3 are illustrations of a portion of a database and a virtual wallet in the authorization system of FIG. 1.

Referring to FIGS. 1, 2 and 3 in one implementation, the authorization system 18 includes a database 75 having one or more entries, represented by entries E1, E2 and E3. Each entry may include one or more items. In the present example, entry E1 includes payment alias 200, account identifier 202, account name 204, billing address 206, contact item 208, notification item 210, and default selection item 212. Each entry may be filled with various items at different times and may be expanded or compressed as necessary.

Payment alias 200 is a user selectable alias for designating a particular payment option. The alias can be presented by the authorization system 18 when referring to a particular payment option without having to identify an exact account number or other identifier for the payment option. Examples of aliases include "My American Express," "Corporate Card," and "Sally's Visa."

Payment account 202 is an identifier that designates a particular payment option associated with the entry E1. Payment account 202 may designate a credit card number, debit card number, a checking, savings, money market or line of credit account number, or other form of payment account. In one implementation, actual account numbers are stored in payment account item 202, but only a portion of the account number is displayed for viewing. Masking the account number provides further security from unauthorized access of the user information. Associated with payment account 202, may be an expiration date 203. Expiration date 203 can include fields for designating the expiration month and year associated with a particular payment account.

Account name 204 designates the name of the account holder associated with the payment account 202. Billing address 206 includes entries for address, city, state and zip code associated with the billing address for the payment account 202.

Contact item 208 includes one or more designated contact points for the owner or authorized users of payment account 202. In one implementation, contact information includes a telephone number. Contact item 208 can include an e-mail address for communication to the customer 14 or other desired recipients. The e-mail address may be used, for example, when the customer's account number is used in a transaction. The authorization system 18 can send e-mail to the designated recipients informing them of each account usage or only that the account is apparently being improperly used. Another example use of the e-mail address is if a customer with specific restrictions attempts a transaction that contradicts those restrictions. Under that circumstance, the authorization system 18 can send an e-mail notifying the account owner of the transaction. Restrictions (e.g., notification items) are discussed in greater detail below.

The account owner can designate notification item 210. Notification item 210 is a set of rules to specify when notification is to occur (e.g., e-mail notification). For example, certain customers may request notification upon every transaction, every transaction that fails authorization, or every transaction over a certain dollar amount.

Default selection 212 allows the customer to designate a particular account entry as a default selection. A default selection can speed the selection process minimizing the number of keystrokes required to complete a transaction. The default payment selection will be marked in the customer's virtual wallet as will be described in greater detail below.

Virtual wallet 65 includes an identifier 67 and an associated entry phrase 69. In one implementation, virtual wallet 65 is identified by an E-mail address for the owner and the entry phrase 69 is securely stored as a one-way mathematical derivative of the actual entry phrase. The owner of a virtual wallet can access the wallet by identifying the wallet (e.g., giving the E-mail address associated with the wallet) and providing the associated entry phrase. Upon verification of the entry phrase, changes or other activity can be invoked. Each entry in the virtual wallet is a pointer to an entry in database 75, designating one payment option.

Virtual wallet 65 includes one or more entries 71 that can be used by a customer in an e-commerce transaction. In one implementation, the user can include credit cards, checking accounts or other methods of payments within the virtual wallet. Entries may be added or edited by an account owner. The method of showing ownership over an entry, and populating and editing wallet entries is described in greater detail below.

It is understood that all of the items in the entry are merely illustrative. Many different items can be used instead of or in addition to any of the items herein disclosed. Entries may be created by a customer or by the issuer of a designated form of payment. Other items may be modified, accessed or removed in various times such as discussed below in the wallet population and modification section.

Database Population

Database 75 can be populated with entries in various ways. One way is for the database to receive data from one or more account issuers (e.g., banks or corporations). The data may be delivered electronically or may be manually entered. However, it is anticipated that the customer will generally enter the payment account information directly to authorization system 18. Information is generally entered at the time a virtual wallet is created and populated as is described below.

Virtual Wallet Population and Modification

Referring to FIGS. 1 through 6, in one implementation the customer may populate (e.g., add entries to) or modify an existing virtual wallet by accessing a specific site 85 on network 12. A virtual wallet population and modification process can be invoked from the site 85. In the present example, the network 12 is the Internet and the specific site 85 is provided by or associated with the authorization system 18. For the sake of clarity, the authorization system 18 is illustrated as a plurality of screen shots shown in FIGS. 4-6, which may appear on a web browser on the customer's computer 14a. In actuality, the process is of the form of computer instructions that reside on a server connected to the network, such as the authorization system 18.

In addition to the screen shots, the site may also include various functional routines that may or may not be apparent to the customer. Some of these functional routines may be provided to the customer's computer 14a, but other functional routines may reside on a computer that is supporting the site 85 in authorization system 18. Site 85 may be accessed by customer 14 entering a uniform research locator (URL) on the customer's computer 14a.

Figure 4:
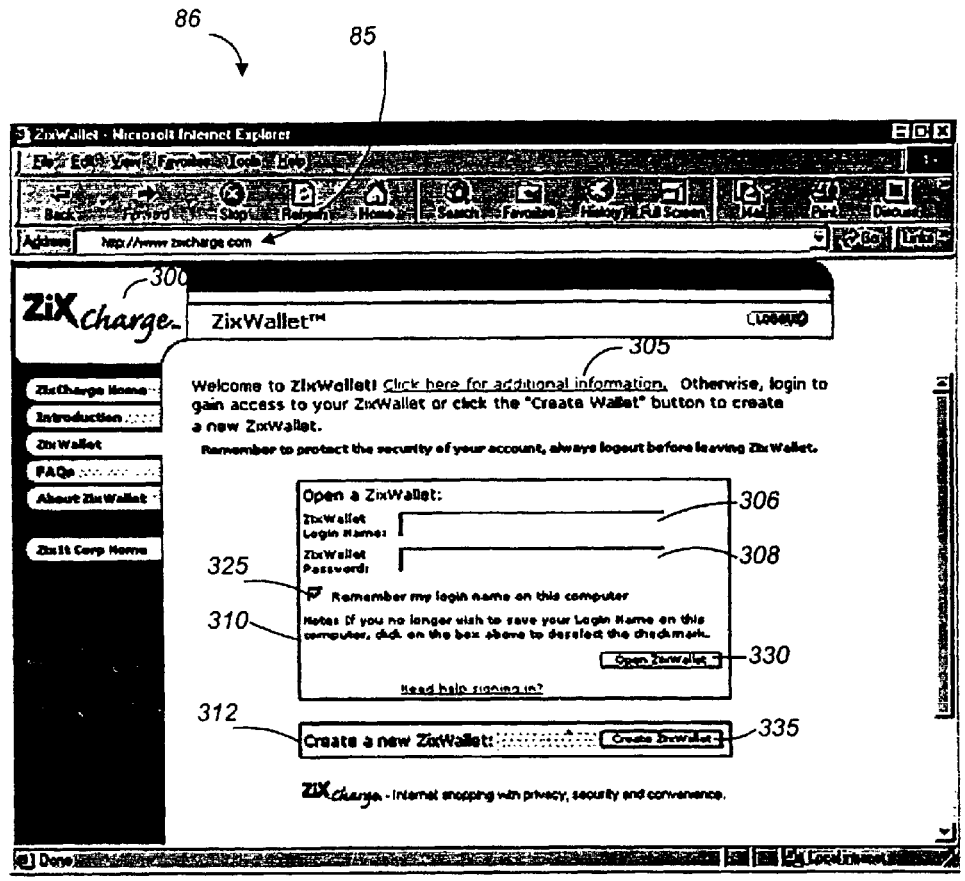
FIGS. 4-6 are illustrations of screens for populating or modifying an entry in the database or virtual wallet of FIGS. 2a-2b.

The URL may be provided to the customer 14 in various manners. For example, the issuer of the account may mail the URL to the customer. Alternatively, the URL can be provided by the merchant 16, can be linked from an account issuer's own web site, can be provided by general commercial advertising or by other possible methods. Upon accessing the site 85, a screen 86 can be selected to appear on the monitor 14b of the customer's computer 14a as is shown in FIG. 4.

In the present example, the screen 86 includes a logo 300. The logo may be specific to the authorization system 18. Although optional, the logo 300 can provide a certain degree of comfort to the customer 14 that the site is authentic, thereby encouraging the customer to complete a population and modification process.

The screen 86 is divided into two portions 310 and 312, one for accessing an existing wallet and one for creating a new wallet. More specifically, screen 86 includes instructions 305 and inputs 306 and 308 to receive the customer's virtual wallet identifier and entry phrase. In one implementation, the virtual wallet identifier is an E-mail address for the wallet's owner. Although the illustrated instructions 305 are quite simple, a link may be provided to more elaborate information about the population and modification process.

In the event a customer is creating a new virtual wallet, screen 86 also includes inputs 306 and 308 to receive the customer's E-mail address and entry phrase and a create wallet button 335. In some implementations, the site 86 includes one or more scripts running in the background of the customer's computer 14a.

Once the wallet identifier and entry phrase have been entered into the inputs 306, 308, the customer may then select the "Open Wallet" button 330 to initiate a population and modification process. Alternatively, once the E-mail address and entry phrase have been provided, the customer may then select the create wallet button 335 to establish a virtual wallet. In one example, an E-mail confirmation message is sent to the wallet owner that must be affirmatively responded to prior to the initiation of the population and modification processes for a new wallet.

Figure 7:
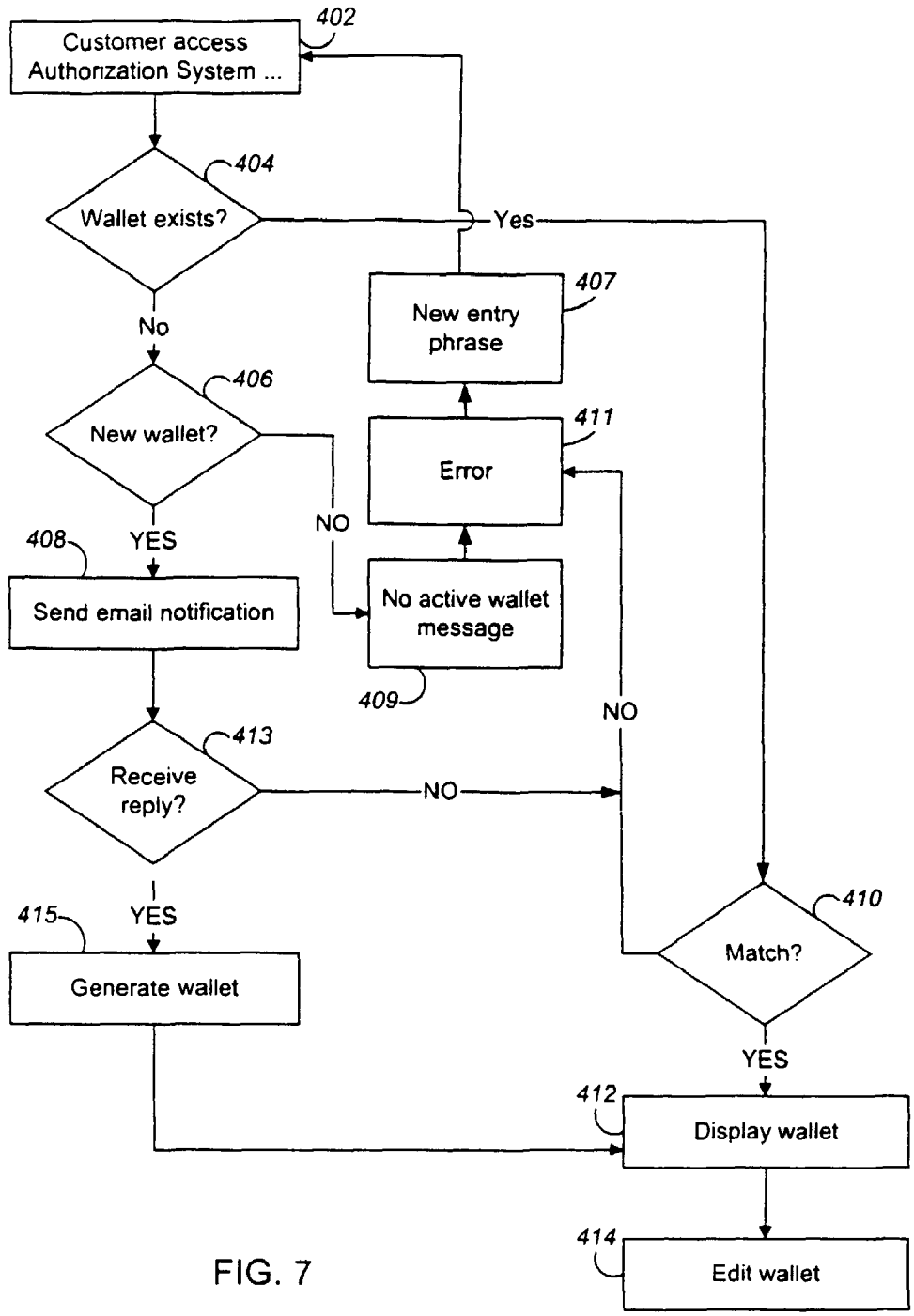
FIG. 7 is a flowchart of an account population/modification process.

Referring now to FIG. 7, one implementation of a population and modification process is designated generally with the reference numeral 400. The population and modification process 400 is not only used for populating a virtual wallet including adding entries in database 75, but may also be used to enter, access, or change certain items in a specific database entry.

Execution of the population and modification process is initiated at step 402 when the customer 14 accesses the authorization system 18. In the present example, the customer 14 accesses the authorization system 18 by correctly entering the wallet identifier and an entry phrase for inputs 306, 308 and selecting the "Open Wallet" button 310.

At step 404, a check is made to determine if the virtual wallet indicated by the identifier provided exists and is active. If the virtual wallet is not active (409), then execution proceeds to an error handling routine at step 411. The appropriate entity (e.g., the customer 14) may be informed of the current situation, be it by error (e.g., the wallet is not active) or other condition. Alternatively, the error handling routine 411 may simply provide a message to the customer 14 to help the customer access the wallet. In one implementation, at step 409 the customer is provided a message that the wallet is not yet active and prompts the user to return the E-mail affirmative confirmation as described in greater detail below.

At step 404, a virtual wallet may not exist. This can result if the customer is attempting to create a new wallet, or an existing wallet is improperly identified. If a new wallet is to be created, the process continues at step 406 including retrieving the identifier for the wallet (e.g. the E-mail address) and the designated entry phrase. Thereafter, at step 408, the authorization system 18 provides an E-mail notification to the wallet's owner (using the wallet identifier). In one implementation, the wallet's owner must provide an affirmative confirmation back to the authorization system 18 (step 413) prior to displaying/using the virtual wallet for a transaction (step 415).

If at step 404, an existing wallet is improperly identified, then the error handling process may invoke a step to prompt the customer to provide a correct identifier for an existing virtual wallet (step 407). In one implementation, the customer 14 is allowed only two failed attempts at providing a proper identifier. If three (3) successive attempts fail, the account entry will be locked from further activity for an extended period of time. This effectively eliminates "brute-force" entry attacks on a virtual wallet.

If a wallet is located, then at step 410, the entry phrase provided is checked against the entry phrase item 69 or stored derivative associated with the designated virtual wallet. If the phrases do not match, then the error handler may be invoked at step 411. The user can be prompted to enter another entry phrase (407) and the process can continue back at step 402. In one implementation, the customer may be prevented from accessing a virtual wallet if more than two (2) failed attempts are registered. If at step 410 the comparison succeeds, the virtual wallet may be made available for viewing or editing purposes at step 412.

Execution then proceeds to step 414 where the customer 14 may enter, access, or change items in the account entry.

Figure 5:
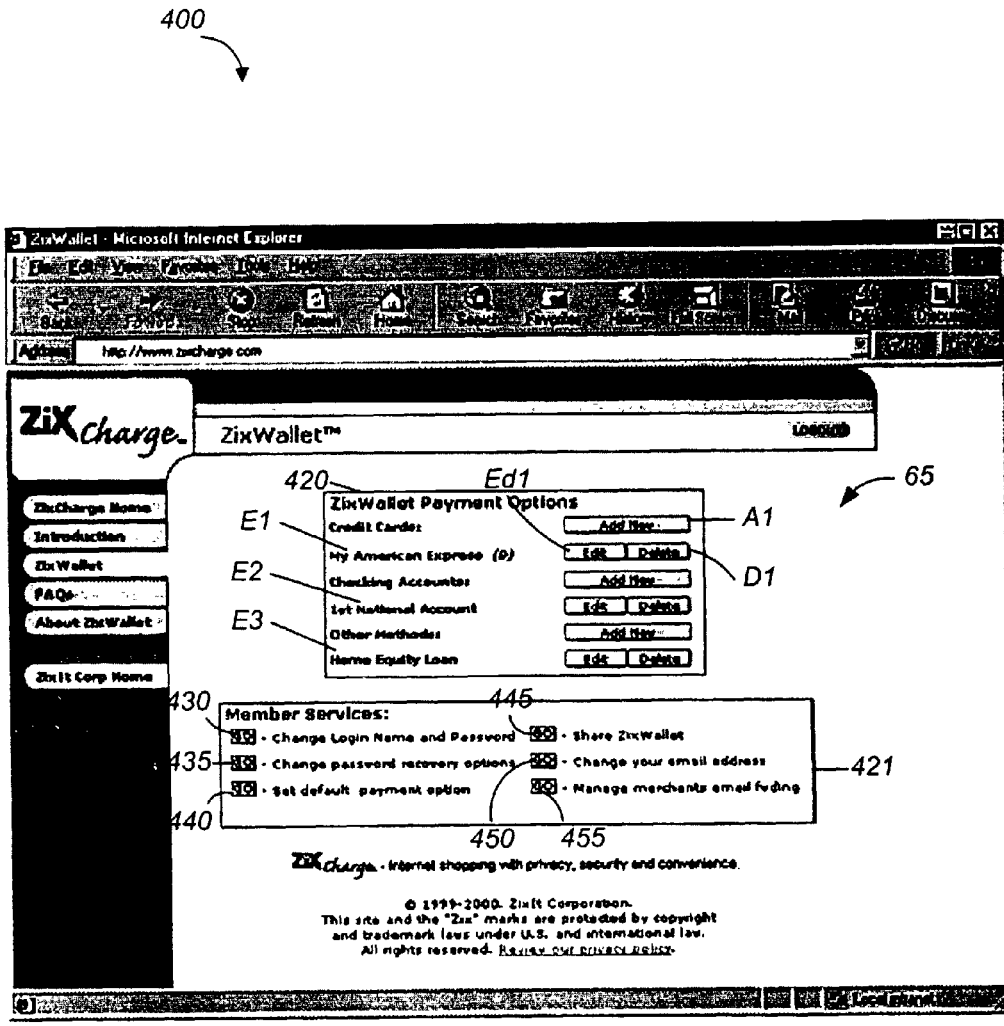

FIG. 5 shows a representation of a user interface that can be generated by authorization system 18 for use by customer 14 of FIG. 1 in viewing the contents of his/her virtual wallet. As shown, virtual wallet 65 includes a payment options section 420 and member services section 421. The payment options section 420 plural entries E1-E3 and one or more items for editing entries or designating payment options. In one implementation, entries are grouped into one or more categories C1-C3. Each category C1-C3 includes actions buttons A1-A3 respectively that can be selected for adding new entries to a given category. Associated with each entry are plural selection buttons ED1-ED3 and D1-D3 that may be selected to allow a user to edit or delete a particular entry. The operation of the each button type is described in greater detail below.

Figure 8:
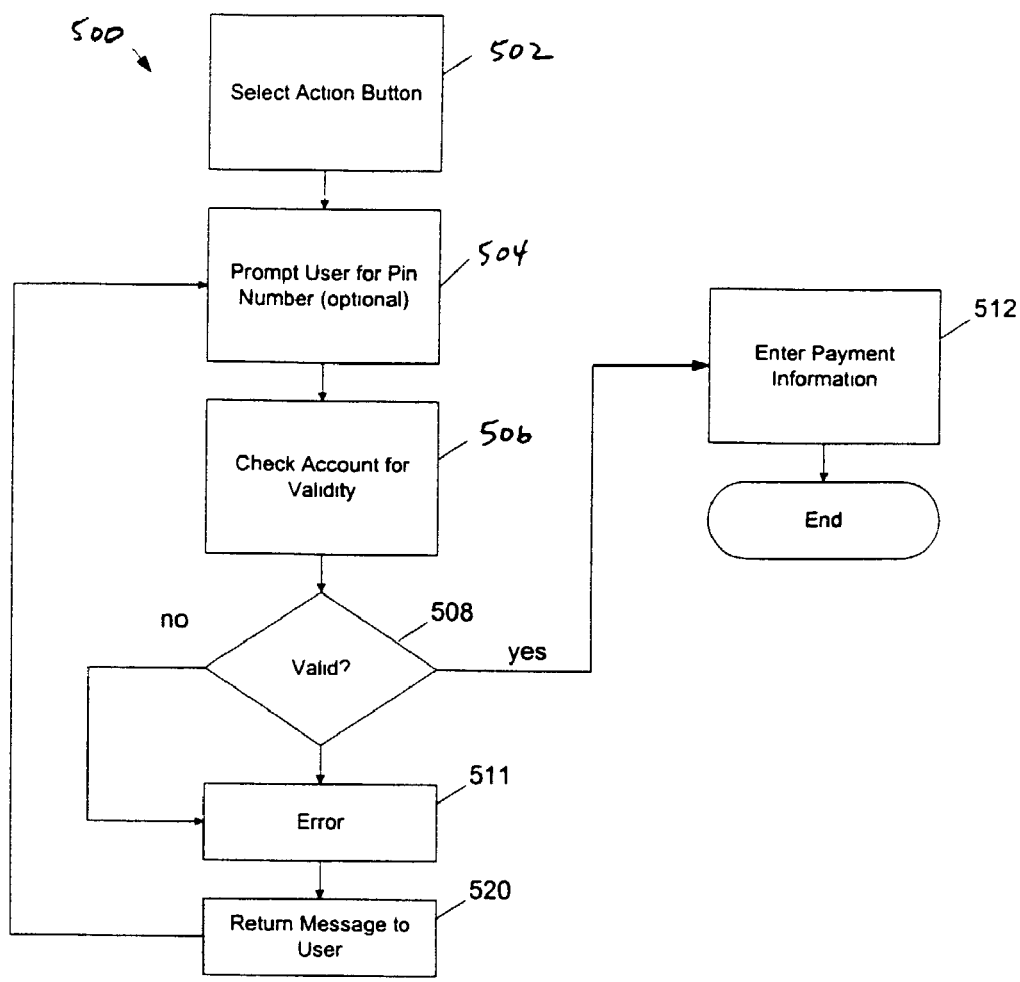
FIG. 8 is a flowchart of a process for adding an entry to a virtual wallet.

An example of one change that can be made is adding an entry to the virtual wallet by invoking a population process. Referring now to FIG. 8, in one implementation, execution of a population process 500 begins at step 502 where an appropriate action button A1-A3 is selected for the category of entry to be added (be that credit card, checking account or other method in the example shown). In one implementation, at step 504 the verification process could include prompting the user for a PIN number for the account number. At step 506, the account number is checked for validity, if possible, and if not valid, an error handling process is invoked at step 511. In one implementation, at step 520 a message can be returned to the customer to indicate that the account has a problem. Problems can range from an account number that is invalid for a particular payment type to the attempted use of an account number already in use in database 75 by different account owner. In one implementation, at step 520, the customer may be directed to register ownership in the account in accordance with the methods disclosed in the U.S. patent application entitled "Transaction Authorization System", to David Cook et. al., and assigned Ser. No. 09/374,073, the contents of which are expressly incorporated herein by reference.

Figure 6:
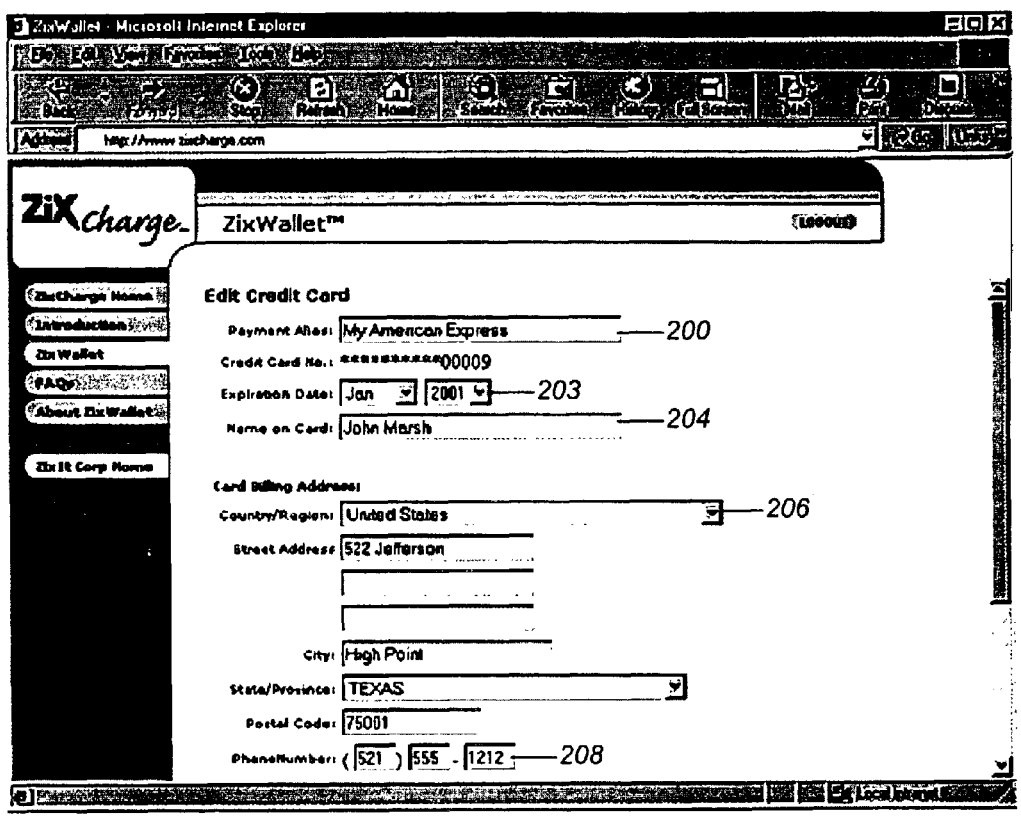

Execution then proceeds to step 512 where customer 14 may enter items in a payment option entry. FIG. 6 shows a representation of a user interface that can be generated by authorization system 18 for use by customer 14 in viewing an entry of his/her virtual wallet. The customer can enter information in one or more fields that correspond to the items. In the example shown, data can be entered by customer 14 for a payment alias 200, expiration date 203, account name 204, billing address 206 and contact item 208.

Other items may also be accessed, updated, or changed, as allowed by any previous restrictions to the account entry. For example, by selecting one of buttons ED1-ED3, an individual entry can be displayed and subsequently edited by the owner. Alternatively, by selecting one of buttons D1-D3, an individual entry in the virtual wallet can be deleted.

In one implementation, additional buttons can be presented in the user interface to allow a customer to perform various high level functions. In the user interface presented in FIG. 3b, the member services section 421 includes buttons for changing login name and password (430), changing password recovery options (435), setting default payment options (440), sharing the ZixWallet (445), changing e-mail address (450), and managing merchant e-mail forwarding (455). Each of these member services will now be briefly described.

The change login name and password service (430) allows a ZixCharge member to change login name and password, for example, if he or she believes that the login name or password has been compromised. The change login and password feature is important, since access to every ZixWallet is by way of a login name and password.

The change password recovery options service (435) allows a ZixCharge member to choose to establish a recovery question hint and a recovery answer that may be used to access their ZixWallet if they have forgotten their password.

The set default payment option service (440) allows a ZixCharge member to set a default payment option. Every time a ZixCharge member buys something, he or she may choose to pay with their default payment option without opening their ZixWallet. The default payment option is noted next to the selected payment option in the ZixWallet, for example, with a symbol (D) that can be seen next to the "My American Express" option in the payment options section 420.

The share the ZixWallet option (445) allows a ZixCharge member to share their ZixWallet with other people, such as a family member, by creating additional login names and passwords for their ZixWallet. The other people can then charge Internet purchases with payment methods in the ZixWallet, but not to see the information for the ZixWallet owner. The ZixWallet owner can be notified by e-mail when persons with whom he has shared the ZixWallet make purchases.

The change e-mail address option (450) allows a ZixCharge member to enter an e-mail address that can be used to confirm the ZixCharge member before a ZixWallet can be activated and used. A member can also create a ZixCharge forwarding e-mail address. The member may provide the ZixCharge e-mail address to merchants instead of their "real" e-mail address. When a merchant sends e-mail to the forwarding e-mail address, ZixCharge will forward the message to the member's "real" e-mail address.

The manage merchant e-mail forwarding option (455) is used to control which emails are forwarded to a member's "real" e-mail address. For example, if a member does not wish to receive emails from a particular merchant, the member may make a note in his ZixWallet and the ZixCharge system will not forward the e-mail to the member.

A wallet import button (not shown) can be selected to enable the transfer of wallet contents from another wallet. In one implementation, the customer must establish ownership of the wallet from which content is to be imported (e.g., provide a wallet identifier and an entry phrase).

A delete wallet button (not shown) can be included in the wallet user interface (FIG. 5) to allow for the deletion of the entire wallet. A view history button (not shown) can be included in the user interface. In one implementation, a database of payment option transactions is maintained. Transactions for each payment option (account) can be retrieved using the view history button. In one implementation, a user-selected greeting phrase (not shown) may be entered and then be displayed each time the customer uses the virtual wallet, thus assuring the customer that he/she is communicating with the authorization system 18 of FIG. 1.

The Transaction

Figure 9:
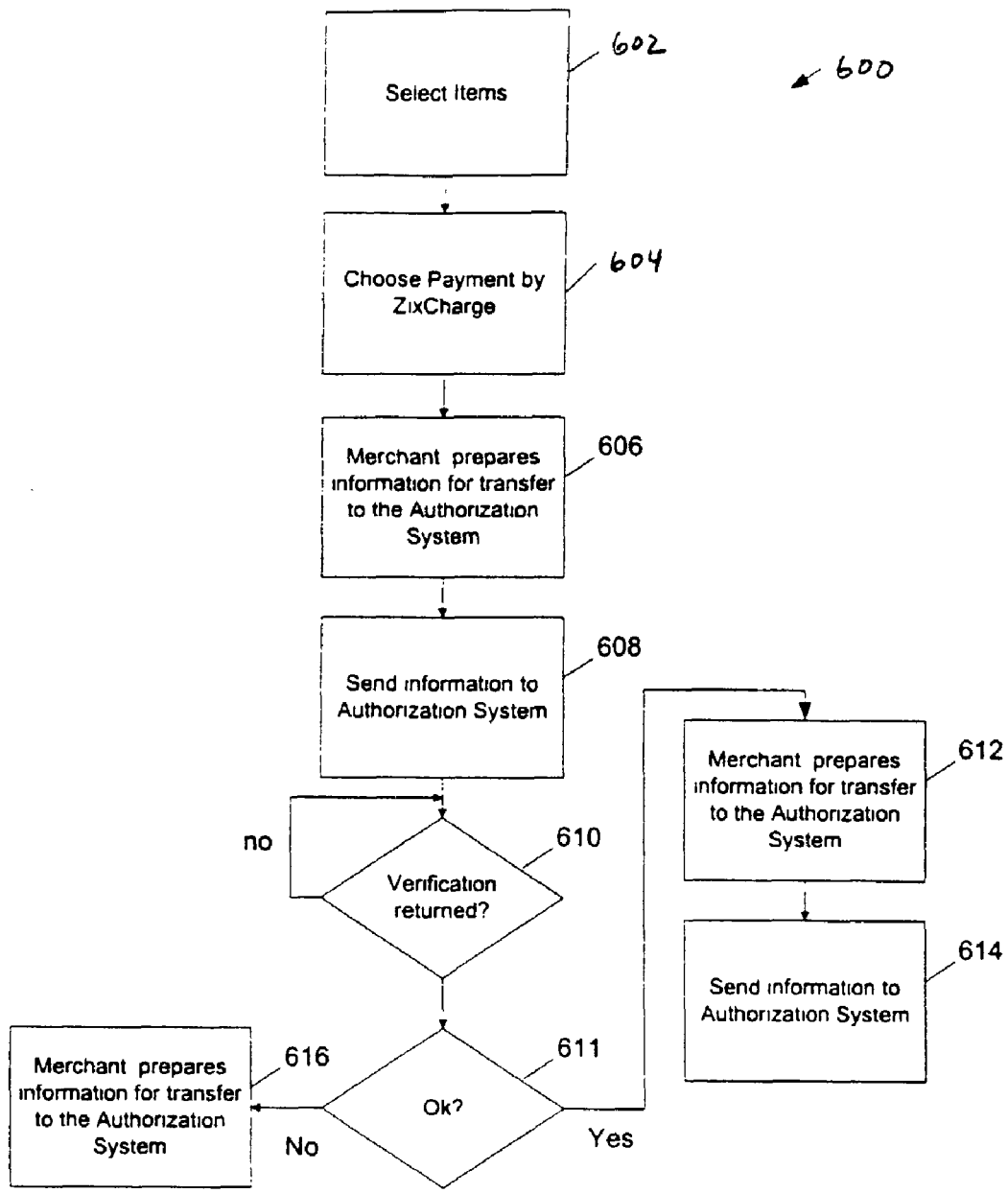
FIG. 9 is a flow chart of a transaction process.
Figure 10:
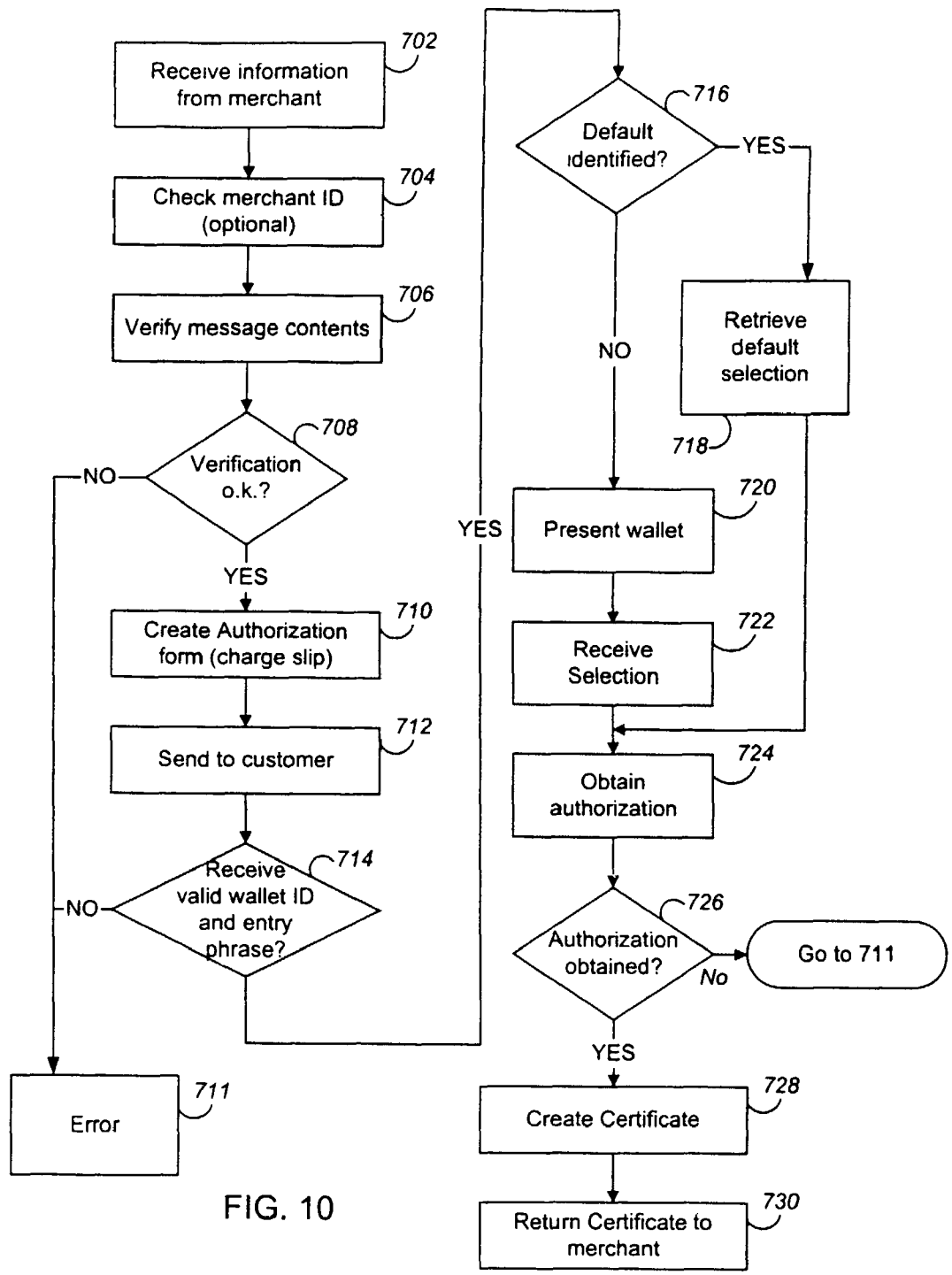
FIG. 10 is a flow chart of an authorization process.

Just as there are many different types of customers 14, networks 12, and merchants 16, there are also many different transaction scenarios. Referring to FIG. 9, a general transaction method 600 is disclosed as between a merchant and a customer, it being understood that the general transaction method 600 is directed to just one example scenario. FIG. 10 shows a general authorization process for the transaction of FIG. 9.

At step 602, the customer 14 selects various items at one or more merchant 16 Internet sites by accessing the merchant(s) over the network 12. At step 604, customer 14 goes to checkout at the merchant site and then initiates authorization by designating authorization system 18. In one implementation, customer 14 selects a button including a logo designating a "ZixCharge" transaction. At step 606, merchant 16 prepares and forwards specific information to authorization system 18 about the transaction. In one implementation, the merchant forwards transaction and merchant specific information to authorization system 18 as described below. In one implementation, the information is forwarded using a buy button in HTML format activated by the customer. Activating the buy button can include invoking several functions provided by the merchant, such as generating one or more of the items listed in Table 1, below.

TABLE 1

| Item | Description |
|------|-------------|
| TURL | Target link (URL) to a specific site on the authorization system 18 |
| RURL | Return link (URL) to screen 700 on the merchant's computer |
| MID  | Merchant identification |
| AMT  | Amount of the transaction |
| REF  | A merchant's transaction reference number |
| TD   | A description of the transaction |
| MSIG | Merchant's digital signature of the present data |

The MSIG item represents the digital signature of the merchant and might not be used in every implementation. Some or all of the Table 1 items in the buy button can be assembled and hashed for use in creating the MSIG item. In one implementation, the digital signing process is described in co-pending U.S. patent application Ser. No. 09/340,853, filed Jun. 28, 1999, and the contents of which are hereby incorporated by reference. The resulting MSIG item authenticates the information and enables the authorization system 18 to confirm that the information has not been tampered with. Furthermore, certain items collected in Table 1 may be encrypted using public key encryption using the public key of authorization system 18. The public key encryption process is also described in the above-referenced and presently incorporated patent application. The information is then electronically sent to the authorization system 18 (608). On the other end, the authorization system 18 performs applicable signature verification, decryption and authentication processes, as described below. Thereafter, the process waits 610 for a return response from the authorization system 18.

Referring now to FIG. 10, one implementation of the authorization process is designated generally by the reference numeral 700. The authorization process may be performed at the authorization system 18 after being accessed through the Internet link indicated by the TURL included in the buy button.

At step 702, the authorization system 18 receives the information sent from the merchant (e.g., using the buy button). The authorization process may check the received MID item (Table 1) to verify the merchant 16 is authorized to use the authorization system 18 and (704), further, may check the validity of the MSIG digital signature against appropriate data provided by the merchant (706).

At step 708, a check is made to determine if all the authentication steps have been satisfied (e.g., steps 704 and 706). If not, an error routine can be invoked 711. If all the authentications have been verified, execution proceeds to step 710 where an authorization form is created for display on the customer's computer monitor 14*b*. The authorization form can be created using data received from the merchant (e.g., from the buy button). Since a wide range of flexibility is anticipated in items overall, many different authorization forms can be created.

The authorization form is then sent to the customer for display in the customer's browser (712). At step 714, a check is made to determine if the information returned from the customer includes a valid wallet identifier and entry phrase. The customer can select a payment account by at least two means (other means are discussed below): selecting an account from a virtual wallet or designating use of the default account associated with a virtual wallet. At step 716, a check is made to determine if the customer has indicated the default wallet selection. If so, the default selection is identified at step 718 and the process continues at step 724. If no default selection has been made, the customer is presented with his/her virtual wallet at step 720, from which a selection can be made. At step 722, the customer selects a payment option by selecting one of buttons (e.g., P1-P3 of FIG. 5) associated with an appropriate entry in the virtual wallet. Thereafter the process continues at step 724. After a selection has been made, authorization is obtained for the transaction from a card/account processor associated with the selection/merchant (724). If the authorization fails (726), the customer can be prompted through an error handling routine (711) to provide another selection. Alternatively, the transaction can fail and an indication of the failure is returned to the merchant.

If an authorization is returned, then a charge certificate is created (728) and forwarded to the merchant (730). The charge certificate can include both authorization details (e.g., a return code) as well as a customer ID, but will not include the confidential information of the customer. The charge certificate is described in greater detail below. Notifications and other authorization system processes can be invoked as appropriate depending on the specification of the customer.

Referring again to FIG. 9, at step 610, the process waits for a response from the authorization system 18. If the authorization response indicates a successful authorization at step 611, execution proceeds to step 612 where the authorization is recorded and at step 614, the transaction is completed and fulfilled according to the merchant's 16 customary credit card fulfillment processes. If at step 611 the return code does not indicate a successful authorization, execution proceeds to step 616 where further action may be employed. Examples of further action may be dependent on the level of information provided to the merchant, such as may be indicated by the particular return code.

Centralized Approval Services

Authorization system 18 provides charge approval services. All incoming charge slip packages are decrypted, validated by the various means, including verifying the digital signature of the merchant.

Authorization system 18 formats an authorization request message containing the required information to obtain a charge card authorization on behalf of both the member and the merchant and then forwards the message to the merchant's charge card authorization processor over dedicated communication lines or other communication connections. In one implementation, the message can be forwarded to an alternate authorization processor.

Upon receiving approval, or not, for the authorization, authorization system 18 sends the authorization information and other information back to the merchant at the merchant Web site 106. E-mail communications for any transaction-specific information can be sent through a forwarding proxy server to the member. The merchant can also be given a special member ID for other purposes, such as aggregating purchasing history data. In one implementation, the merchant may send E-mail to the member ID at a forwarding proxy, which then sends the message to the consumer. The consumer is optionally allowed to block the forwarding of messages sent to the member ID.

In one implementation, authorization system 18 allows a non-member to become registered by using a charge slip for a first time. In this case, the information provided for Email address can be verified by appropriate external procedures prior to sending the authorization request to authorization system 18.

Transaction Certificates

In some embodiments, the authorization system 18 may provide one or more transaction certificates to the merchant 16, the account issuer, and/or the customer 14. One goal of the certificates is to provide a self-validating record that authenticates and memorializes a specific execution of the transaction by the customer 14. Table 2 provides one implementation of an account certificate.

TABLE 2

| Item | Description |
| --- | --- |
| RETURN | Return code |
| DATE/TIME | An exact time and date. |
| MID | Table 1, above |
| REF | Table 1, above |
| AMT | Table 1, above |
| H4 | Hash of specific optional purchase information provided by merchant and acknowledged by customer |
| APPCODE | Approval code |
| OTHER2 | Additional data |
| SEQ | Sequence number from the authorization system |
| ROOT | Root certificate of the authorization system |
| SIGNATURE | Digital signature from the authorization system |

Several of the items in the account certificate of Table 2 are discussed elsewhere in the present disclosure. The authorization process generates a return code and DATE/TIME value. For the utmost accuracy, an atomic clock can be used to provide the DATE/TIME value. The values MID, AMT, and REF may be provided by the merchant 16 to the authorization system 18. The APPCODE may be a traditional approval code, such as provided by conventional credit card authorization or fraud detection systems, and may require external systems to participate in order to obtain this code.

The authorization system 18 can hash certain information included in Table 1 to generate the H4 value. In one embodiment, the H4 value is the hash of the TD item from Table 1. Including the H4 value in the transaction certificate uniquely associates the account certificate to the particular transaction description.

The SEQ value is a unique value given by the authorization system 18 for a specific certificate. For the sake of example, every certificate issued by the authorization system 18 may be numbered sequentially, e.g., 1, 2, 3, 4, . . . .

The ROOT value represents a root certificate of the authorization system 18. In one embodiment, the ROOT value includes a public encryption key for the authorization system 18, digitally signed by four separate private keys, whose corresponding public keys are known.

The SIGNATURE value is a digital signature provided by the authorization system 18. The authorization system 18 produces its digital signature by using a private key that corresponds to the ROOT public encryption key (discussed above) to digitally sign the transaction certificate. The process of digitally signing is described in greater detail in the presently incorporated U.S. patent application Ser. No. 09/340,853. Some or all of the items in the certificate are assembled and hashed for use in the digital signature. The digital signature thereby authenticates the transaction certificate and enables the merchant site system to confirm that the information included in the transaction certificate originated at the site and has not been tampered with during transmission. Furthermore, the combination of the SIGNATURE and ROOT values makes the transaction certificate self-validating.

When the merchant 16 receives the charge certificate, the merchant can perform a verification process to check the validity of the digital signature from the authorization system 18. Once the validity is confirmed, the merchant 16 can automatically process the transaction using the merchant's conventional credit card handling techniques, if applicable. If all tests pass, a record can be formatted and stored per the merchant's specifications.

The invention will now be described in further detail by way of example. In accordance with one implementation of the invention, the ZixCharge system can be described in terms of four main processes that can be carried out in the ZixCharge system. The four processes are member sign-up, shopping, charge authorization, and post purchase processing. Each of the processes, as well as the user interfaces associated with the four processes, will be described with reference to the drawings.

Figure 11:
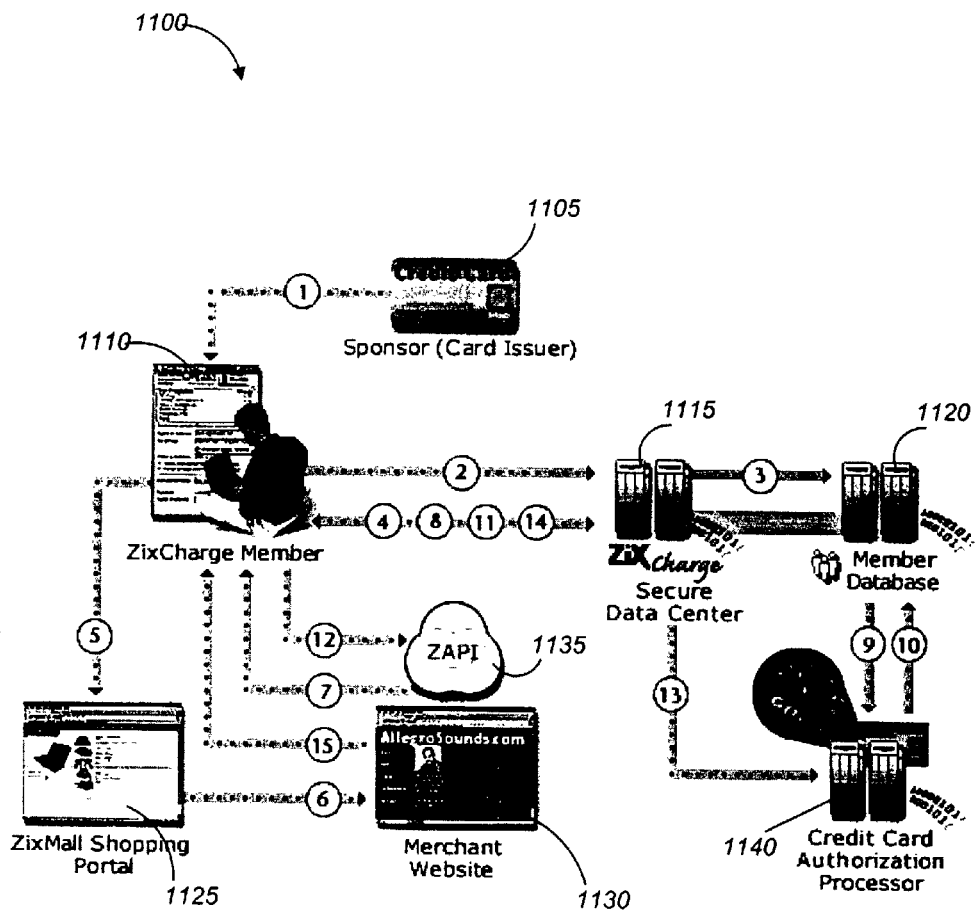
FIG. 11 is a schematic diagram of a transaction in accordance with one implementation of the invention.

FIG. 11 shows a schematic overview of one implementation of a transaction using the ZixCharge system (1100), and the order in which interactions occur between different components in the system. The components include a sponsor (1105), a ZixCharge member (1110), a secure ZixCharge data center (1115), a member database (1120), a ZixMall shopping portal (1125), a merchant website (1130), ZAPI (1135) and a credit card authorizations processor (1140). All the components are interconnected with communication channels over which interactions can occur. The numbers on the communication channels (1-15) corresponds to the order in which interactions occur between the components on either side of the communication channel, in accordance with one implementation of the invention. In the following description, only the components of the system that are active in a given process will be shown for reasons of clarity.

Becoming a Member

Figure 12:
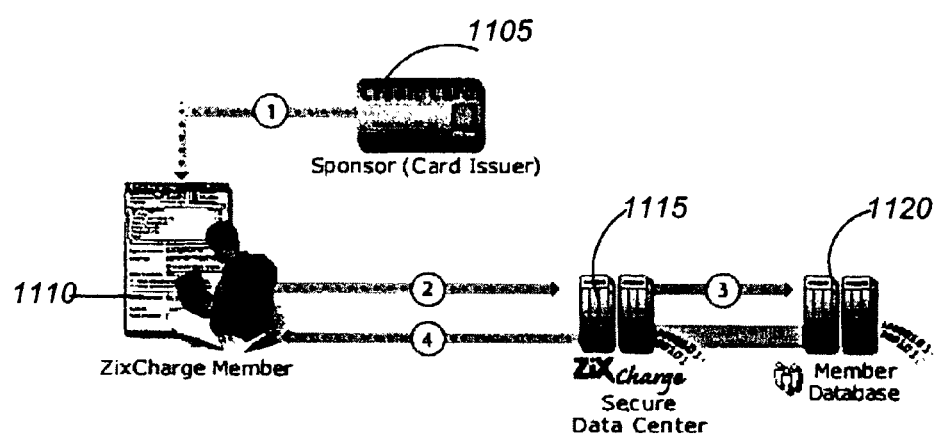
FIG. 12 is a schematic diagram of a subsection of the transaction of FIG. 11.
Figure 13:
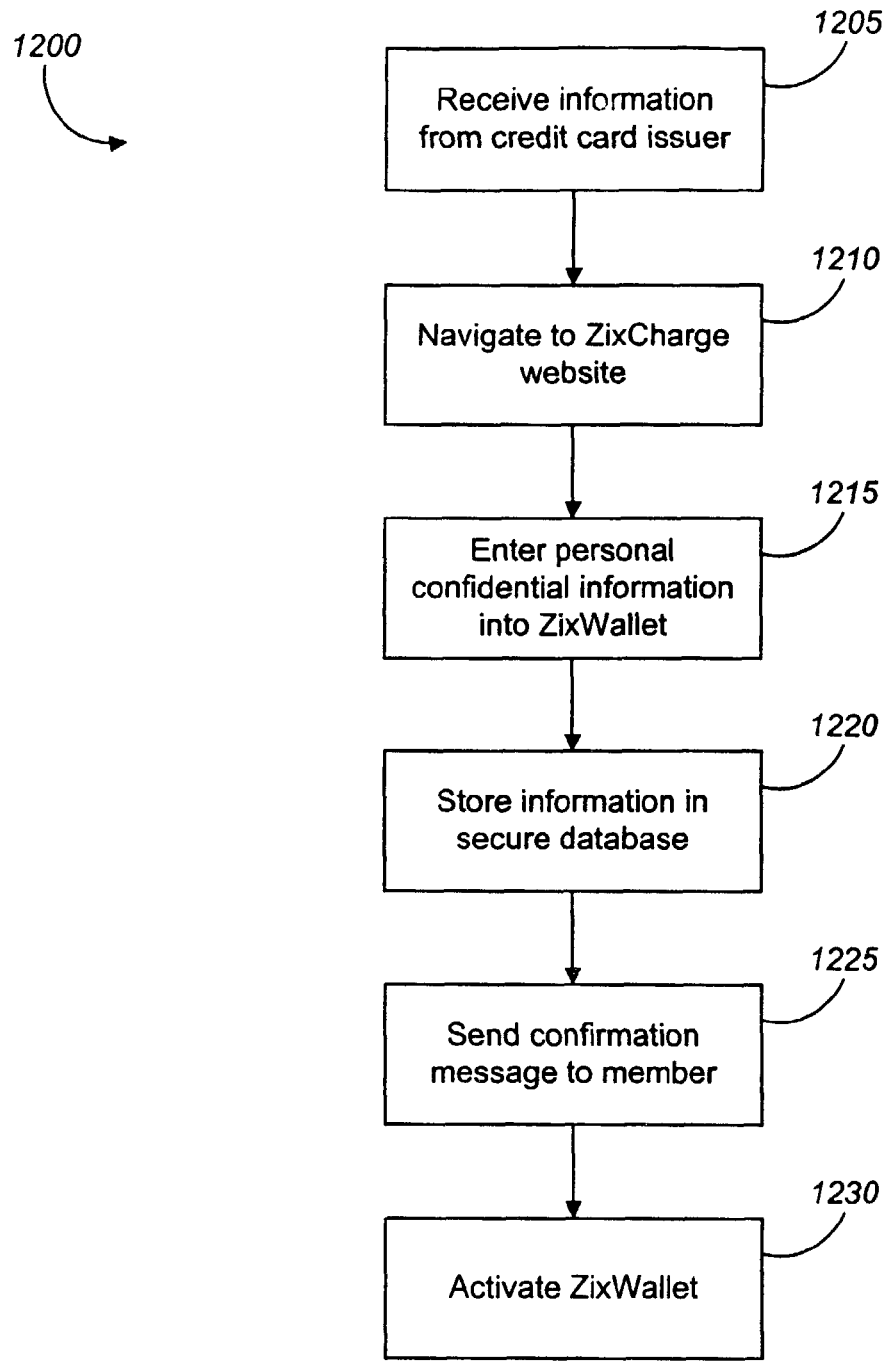
FIG. 13 is a block diagram of a member registration process.

FIG. 12 shows the system components (1105-1120) that are involved when a person signs up for becoming a member of the ZixCharge system (1100) and FIG. 13 shows a corresponding sign-up process (1200). As can be seen in FIG. 13, the process can start when a sponsor (1105), such as a financial institution, notifies cardholders about the availability and benefits of using their credit cards, debit cards, checking accounts, lines of credit, and so on, to shop privately and securely on the Internet with the ZixCharge system (step 1205).

Consumers (1110) who are interested in private and secure Internet transactions respond to the notification, for example, by navigating to the ZixCharge web site (step 1210). At the ZixCharge web site, the consumers (1110) enter personal information, such as address and charge card information, into a ZixWallet (step 1215). The ZixWallet interface will be further described below with reference to FIGS. 13-15. The information entered by the consumers (1110) is stored in a secure ZixCharge member database (1120) (step 1220).

The ZixCharge system (1100) confirms the new member's e-mail address by sending a confirmation e-mail message with a URL within the message (step 1225). The new member (1110) clicks on the URL in the message and thereby activates the ZixWallet (step 1230). In addition to the URL, the e-mail message can contain information about the ZixCharge system, the ZixMall portal, other branded ZixCharge shopping portals, or any other type of information or advertising information that may be beneficial for the new member.

FIG. 3 shows an exemplary login screen (86) for a ZixWallet that can be displayed in a conventional web browser, such as Netscape Navigator or Internet Explorer. A login window is provided that includes a login name field and an entry phrase field into which a member can enter a login name and an entry phrase, respectively, to access his or her existing ZixWallet. FIG. 4 shows an exemplary ZixWallet 400 after a member has successfully logged in using his or her login name and entry phrase.

FIG. 5 shows an exemplary screen (500) that is displayed after a user clicks one of the buttons to edit credit card information or add a new credit card in the ZixWallet payment options box (420) shown in FIG. 4. The screen includes multiple fields in which the user can enter credit card related information, such as a payment alias field where the member can enter a nickname for the credit card, fields for a credit card number and expiration date, and fields for name, address, and phone number that are used for billing verification purposes. This completes the description of the exemplary ZixWallet interfaces. The description will now continue with how the ZixWallet is used in a shopping situation.

Shopping

Figure 14:
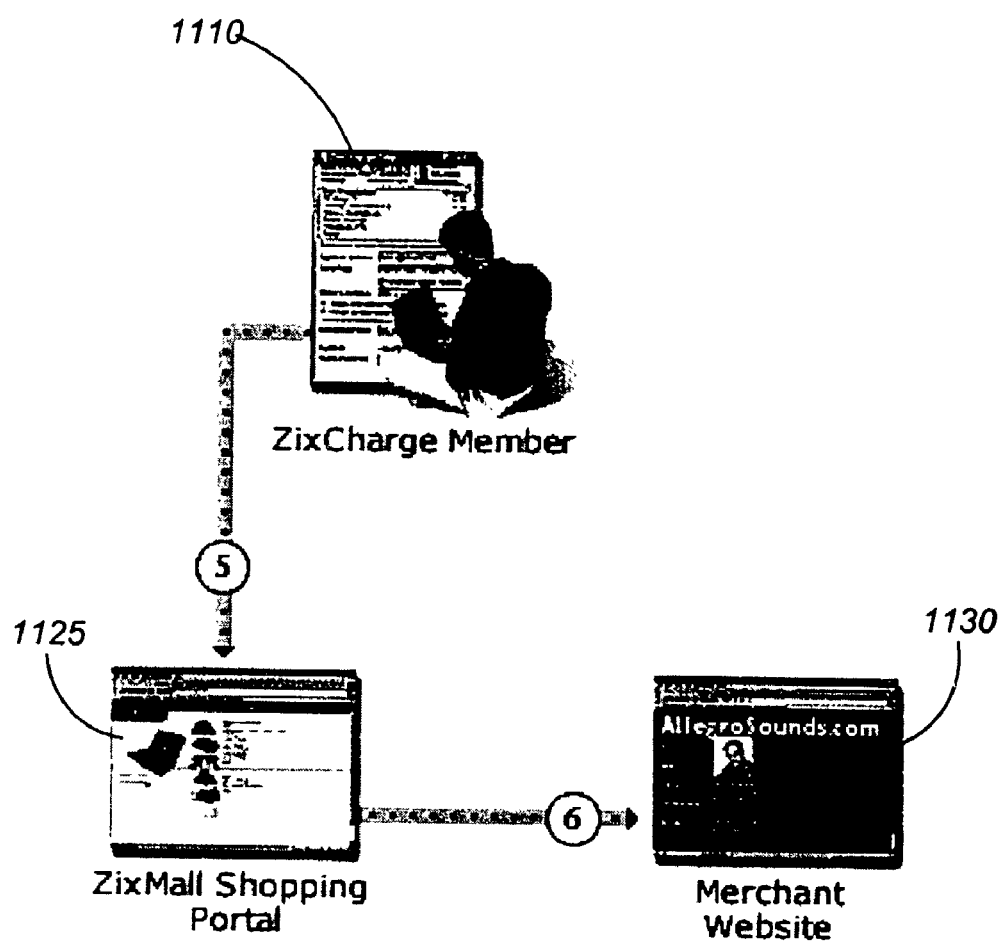
FIG. 14 is a schematic diagram of a shopping process for use with the ZixCharge system of FIG. 11.
Figure 15:
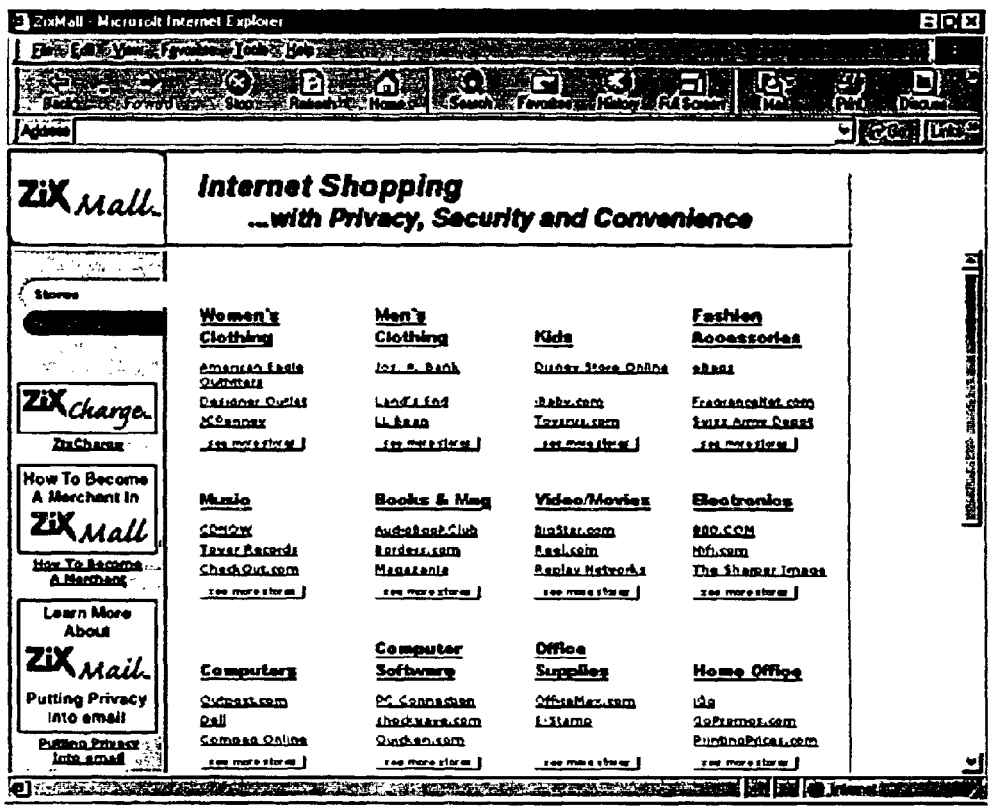
FIG. 15 is a screenshot of a ZixMall Internet shopping portal.

As can be seen in FIG. 14, after the member (1110) has established a ZixWallet and entered information for the payment options he or she wishes to have included in his or her ZixWallet the member can go to a ZixMall website (1125), or any other ZixCharge enabled web site. As was briefly described above, the ZixMall is a ZixCharge enabled shopping portal. The ZixMall contains a number of links to merchant websites, the links preferably being organized by type of merchandise. An exemplary ZixMall can be seen in FIG. 15, where a number of merchants are organized in accordance with the type of products they offer, such as women's clothing, music, computers, and so on. ZixMall (1125) can optionally include prominent logo placement for ZixCharge sponsors. At the ZixMall (1125), the member (1110) clicks a link to a merchant website and is linked to the merchant website (1130).

When the member arrives at the merchant website (1130), he or she has full access to the merchant website. The shopping experience at the ZixCharge merchant website (1130) is much like shopping at any conventional shopping website. The member puts merchandise in a "shopping cart" and gives the merchant a shipping address for where the member wishes to have the purchase sent. When the merchant asks for an e-mail address, the ZixCharge member may give his "real" e-mail address or give his ZixCharge forwarding address, as described above. Instead of requiring credit card information, a ZixCharge merchant will present a "Buy with ZixCharge" button to ZixCharge members who have linked to the merchants through the ZixMall.

Charge Authorization

Figure 16:
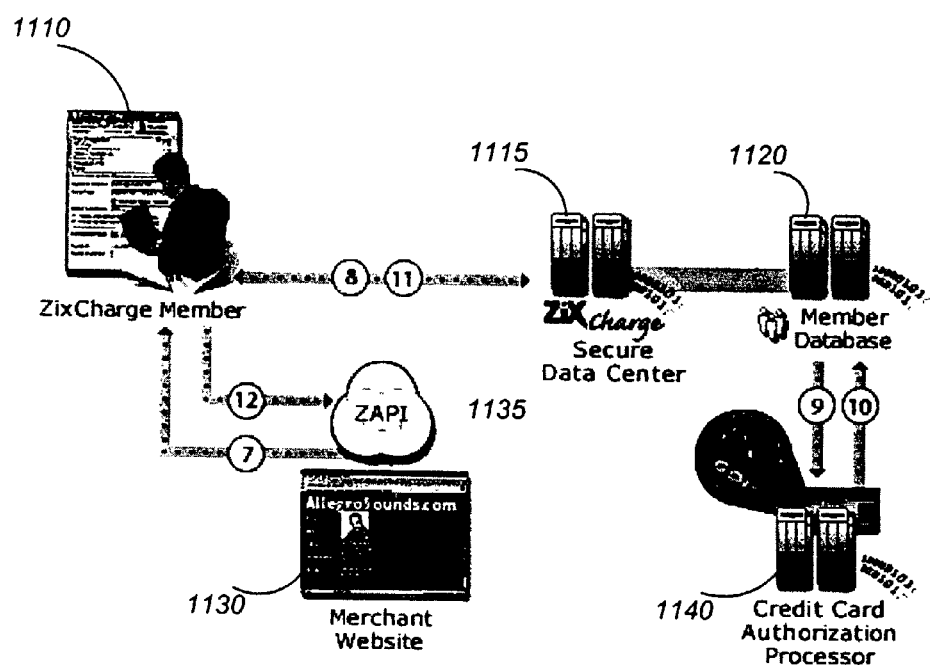
FIG. 16 is a schematic diagram of an authorization process for the ZixCharge system of FIG. 11.
Figure 17:
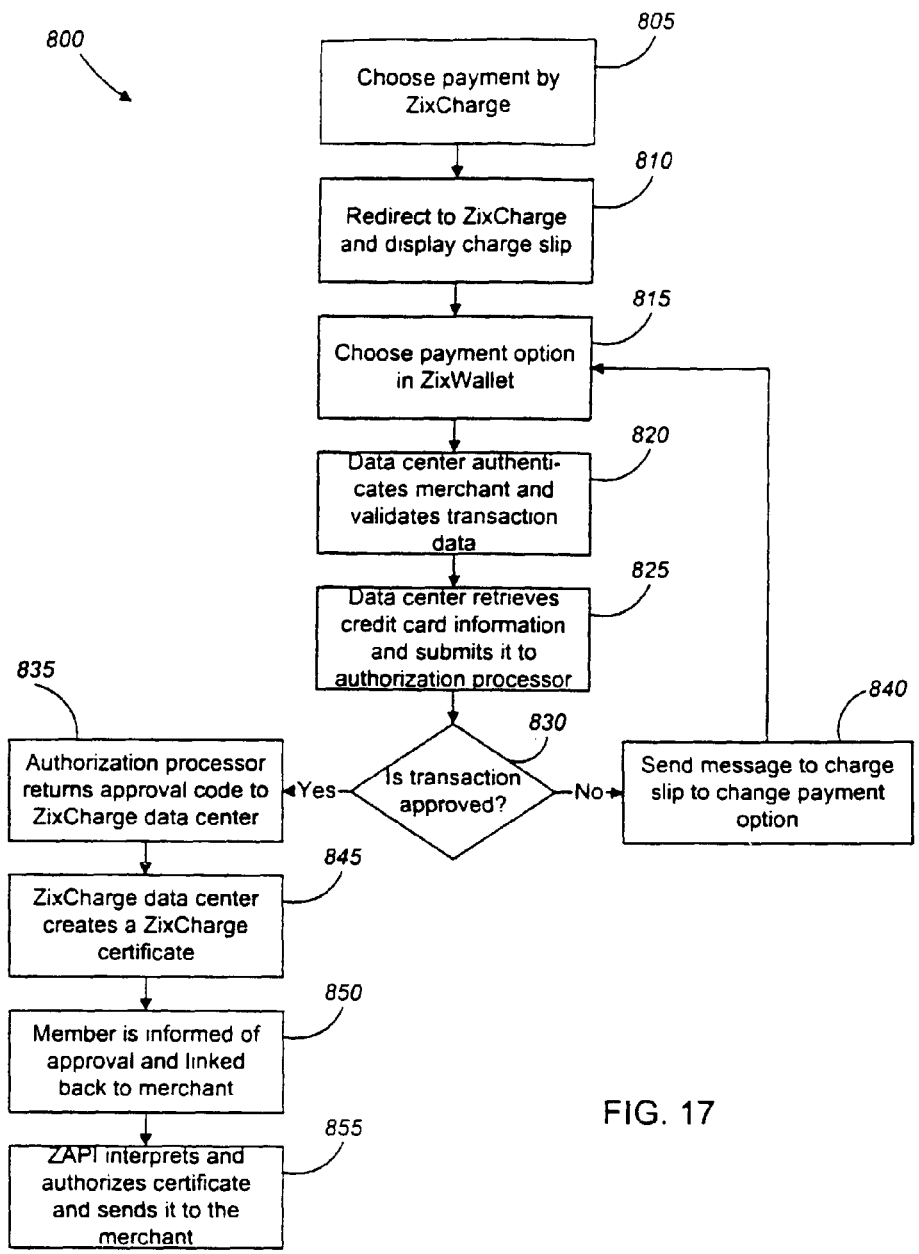
FIG. 17 is a block diagram of an authorization process.

FIG. 16 shows the system components (1110, 1115, 1120, 1130, 1135 and 1140) that are involved in charge authorization in the ZixCharge system (1100) and FIG. 17 shows a corresponding charge authorization process (800). As can be seen in FIG. 17, the process starts with a user choosing to buy with the ZixCharge system (step 805), for example, by clicking a "Buy with ZixCharge" button during a checkout at the merchant website (1130).

Figure 18:
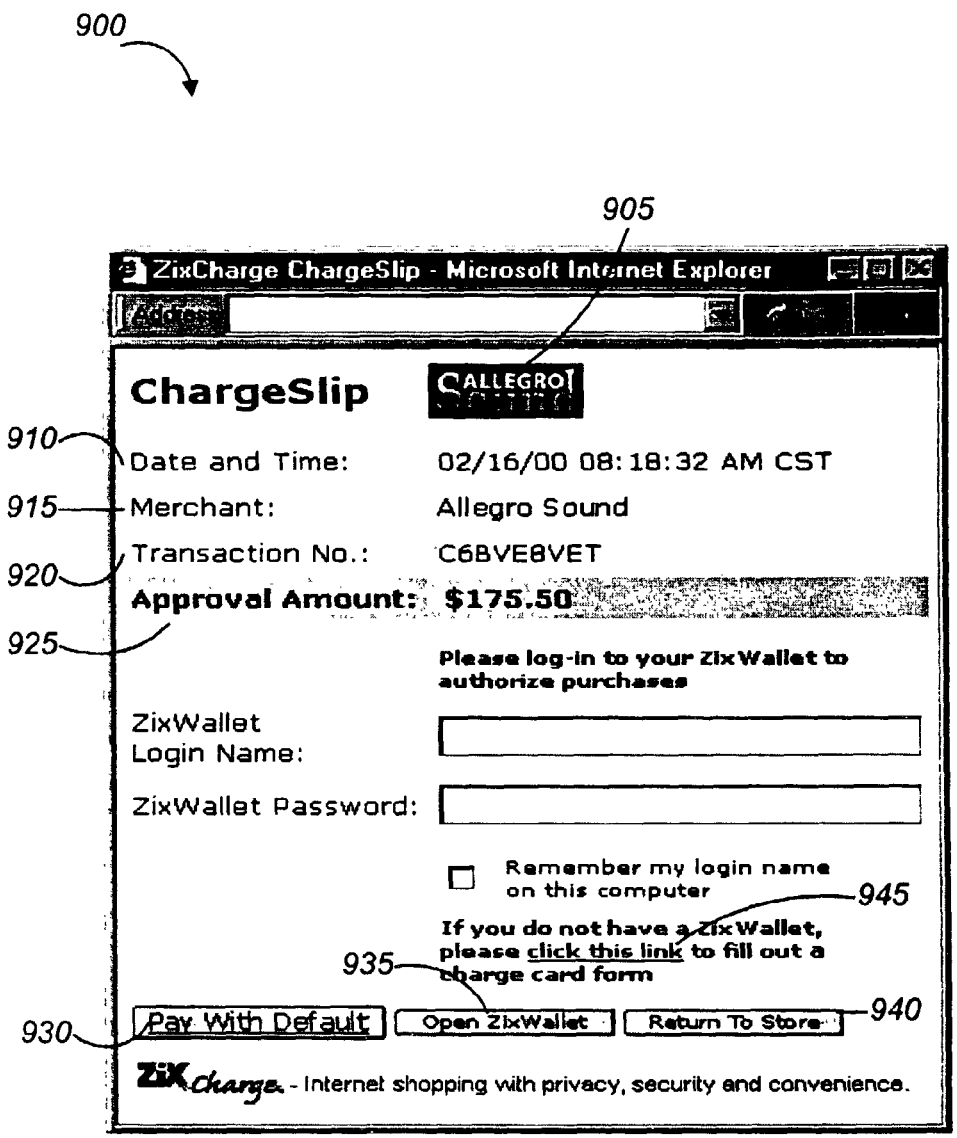
FIG. 18 is a screenshot of a charge slip.
Figure 19:
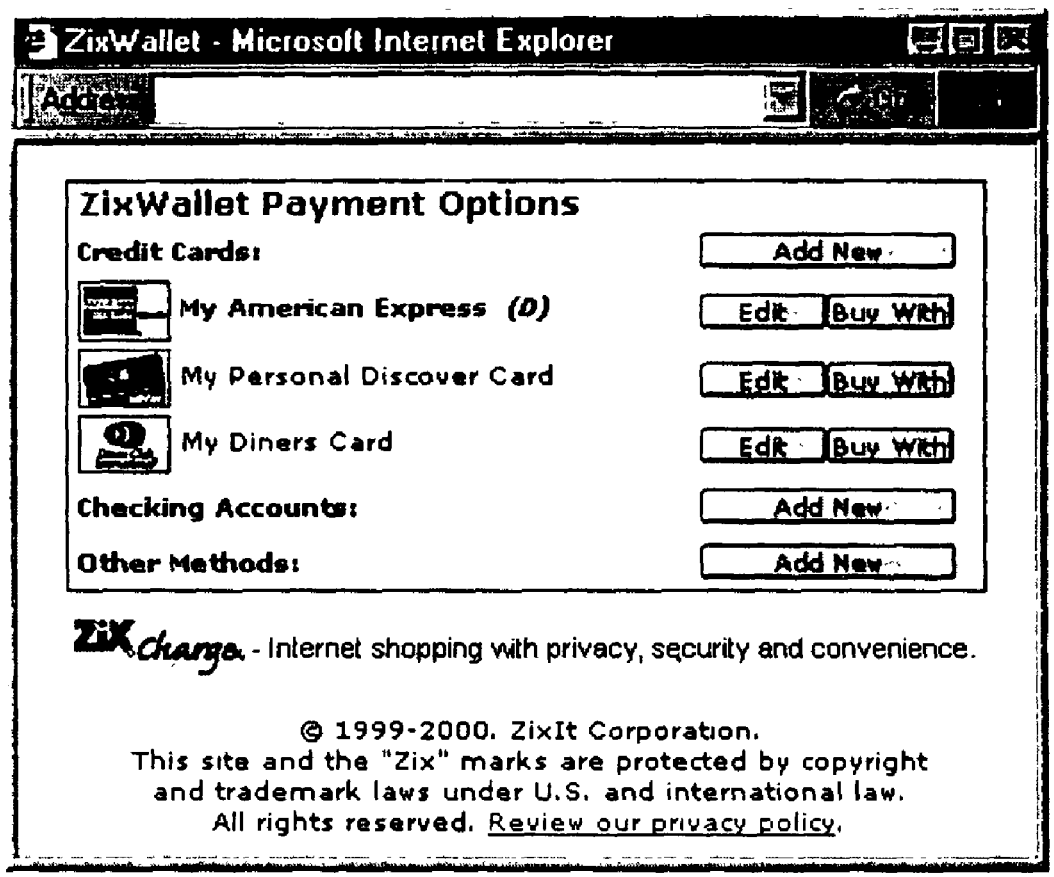
FIG. 19 is a screenshot of a ZixWallet payment options window.

The user is redirected to the ZixCharge web site via a secure connection, e.g., an SSL connection, and a charge slip is displayed in the browser window of the member's computer (step 810). An exemplary charge slip (900) is shown in FIG. 18. Features of the charge slip (900) can include all of the following. A merchant logo (905) is displayed at the top of the slip. A date and time stamp (910), expressed in local time for the consumer, is retrieved from an official clock in the ZixCharge secure data center (1115) and is displayed to the member. A merchant name (915) from whom the purchase is being made is displayed. A transaction number (920) assigned by the merchant is displayed. The transaction number is used to track the transaction through the merchant system. The consumer can use the transaction number as a reference for purchase inquiries. An approval amount (925) is displayed. The approval amount is the amount that the consumer or member will authorize to be charged for the transaction. The charge slip (900) also includes a button that the user can click to pay with the default payment option (930) discussed above. If the user does not wish to use the default payment option he can choose to open the ZixWallet by clicking a different button (935). A view of the open ZixWallet can be seen in FIG. 19. Alternatively, the user can return to the store by clicking a different button (940). If the user does not wish to use the ZixCharge system, he can click a link (945) to fill out a regular charge card form.

The ZixCharge secure data center (1115) receives the member's payment choice, authenticates the merchant, and validates the transaction data (step 820). The member's credit card information is retrieved and then, following any merchant-specified fraud screening process, submitted along with other appropriate data to the credit card authorization processor (1140) on behalf of the merchant (step 825). The authorization is submitted using a merchant provided identifier. The merchant provided identifier can be one used to clear all transactions with a respective card processor.

The process then checks if the transaction is approved (step 830). If the transaction is not approved, a message is sent to the charge slip (e.g., in the user's browser) to ask the member to select a different payment method and resubmit the charge slip (step 840), and the process continues from step 815.

If the transaction is approved, an approval code is returned from the authorization processor (140) to the ZixCharge data center (1115) (step 835). The ZixCharge system records the transaction and creates a ZixCharge certificate containing the approval code and other data for the merchant (step 845). The member is informed of the approval and linked back to the merchant (step 850). Finally, ZAPI interprets and authenticates the returned ZixCharge certificate and conveys the approval code and other information to the merchant (step 855).

Post Purchase Processing Details

Figure 20:
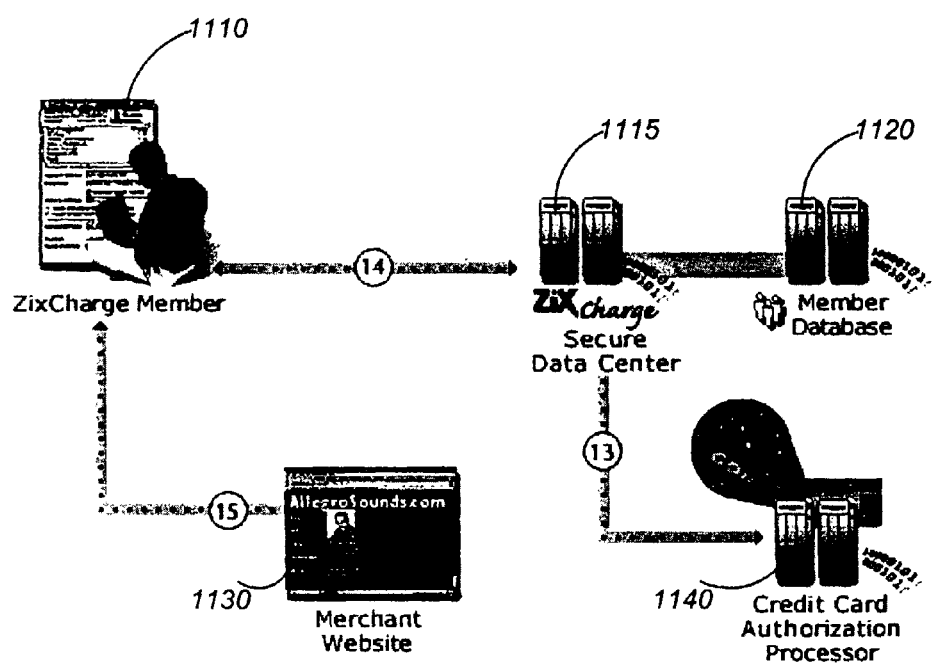
FIG. 20 is a schematic diagram of a subsection of the ZixCharge system of FIG. 1.

FIG. 20 shows some of the interactions that occur after a purchase has been made. The secure ZixCharge data center (1115) submits normal payment confirmation batches on behalf of the merchant to the credit card authorization processor (1140). Statements reflecting the details for the payments authorized through the ZixCharge system (1100) are periodically sent to members (1110) by secure e-mail, such as ZixMail. Additionally, members (1110) can access their authorization history through their ZixWallet.

The merchant (1130) is given a unique ZixCharge member ID for each transaction. The ZixCharge member ID allows the merchant (1130) to aggregate purchase information without knowing the actual identity of the consumer or member. If there is a transaction dispute, the member's personal and credit card information may be forwarded to the merchant The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

It is understood that modifications, changes and substitutions are intended in the foregoing disclosure and in some instances some features of the disclosure will be employed without corresponding use of other features. Furthermore, additional features may be employed without changing the operation of the present invention. Accordingly, it is appropriate that the appended claims be construed broadly and in a manner consistent with the scope of the disclosure.

What is claimed:

1. A system for authorizing a transaction between a customer and an e-commerce merchant, the system comprising:
    an electronic wallet maintained in a server including payment options, each payment option including personal payment information associated with a customer, one payment option being designated as a default payment option; and
    a proxy device, in communication with the server and independent of the customer and a merchant, that includes a processor that is programmed to:
        receive an authorization request from the merchant to process a transaction by the customer;
        verify the authorization request including verifying the merchant;
        create an authorization form that includes a prompt for a wallet identifier, an entry phrase, and for an indication to use the default payment option;
        receive a response that includes a wallet identifier, an entry phrase, and an indication to use the default payment option;
        verify the wallet identifier and entry phrase;
        determine whether a default payment option has previously been designated by the customer in the wallet associated with the wallet identifier;
        generate, in response to the authorization request, an approval request that includes the default payment option based on the received indication to use the default payment option;
        forward the approval request including the default payment option designation to the customer for approval before completing the transaction; and
        process the transaction on behalf of the merchant and the customer using the default payment option, the proxy device processing the transaction and returning to the merchant an approval code associated with the transaction without transferring any of the personal payment information associated with the customer to the merchant.

2. A method for authorizing a transaction between a customer and an e-commerce merchant, the method comprising:
    providing a wallet including payment options, each payment option including personal payment information associated with a customer, one payment option being designated as a default payment option;
    receiving, by a proxy device, independent of the customer and a merchant, an authorization request from the merchant to process a transaction by the customer;
    verifying, by the proxy device, the authorization request including verifying the merchant;
    creating, by the proxy device, an authorization form that includes a prompt for a wallet identifier, an entry phrase, and for an indication to use the default payment option;
    receiving, by the proxy device, a response that includes a wallet identifier, an entry phrase, and indication to use the default payment option;
    verifying, by the proxy device, the wallet identifier and entry phrase;
    determining, by the proxy device, whether a default payment option has previously been designated by the customer in the wallet associated with the wallet identifier;
    generating, by the proxy device and in response to the authorization request, an approval request that includes the default payment option based on the received indication to use the default payment option;
    forwarding, by the proxy device, the approval request including the default payment option designation to the customer for approval before completing the transaction; and
    processing the transaction by the proxy device on behalf of the merchant and the customer using the default payment option, the proxy device processing the transaction and returning to the merchant an approval code associated with the transaction without transferring any of the personal payment information associated with the customer to the merchant.

3. The system of claim 1, wherein the proxy device returns transaction information to the merchant, the transaction information including non-confidential information associated with the customer.

4. The system of claim 1, wherein the proxy device digitally signs and returns a self-validating transaction certificate including the approval code.

5. The system of claim 1, wherein the proxy device presents the payment options to the customer and receives the payment option designation from the customer.

6. The system of claim 5, wherein the proxy device presents the payment options to the customer, each payment option including an associated logo.

7. The system of claim 5, wherein the proxy device presents the payment options as a web page.

8. The system of claim 5, wherein the proxy device presents a logo associated with the merchant.

9. The system of claim 1, wherein the proxy device processes an e-mail associated with the transaction on behalf of the merchant, where the personal payment information includes an e-mail address.

10. The method of claim 2, wherein processing further comprises returning transaction information to the merchant, the transaction information including non-confidential information associated with the customer.

11. The method of claim 2, wherein processing further comprises signing and returning a self-validating transaction certificate including the approval code.

12. The method of claim 2, wherein processing further comprises presenting the payment options to the customer and receiving the payment option designation from the customer.

13. The method of claim 12, wherein presenting further comprises presenting the payment options to the customer, each payment option including an associated logo.

14. The method of claim 12, wherein presenting further comprises presenting the payment options as a web page.

15. The method of claim 12, wherein presenting further comprises presenting a logo associated with the merchant.

16. The method of claim 2, further comprising processing an e-mail associated with the transaction on behalf of the merchant, where the personal information includes an e-mail address.

17. A non-transitory computer-readable medium operatively coupled to a processor and including instructions, which, when executed by the processor, causes the processor to perform operations comprising:
 providing a wallet including payment options, each payment option including personal payment information associated with a customer, one payment option being designated as a default payment option;
 receiving an authorization request from the merchant to process a transaction by the customer;
 verifying the authorization including verifying the merchant;
 creating an authorization form that includes a prompt for a wallet identifier, an entry phrase, and for an indication to use the default payment option;
 receiving a response that includes a wallet identifier, an entry phrase, and an indication to use the default payment option;
 verifying the wallet identifier and entry phrase;
 determining whether a default payment option has previously been designated by the customer in the wallet associated with the wallet identifier;
 generating, in response to the authorization request, an approval request that includes the default payment option based on the received indication to use the default payment option;
 forwarding the approval request including the default payment option designation to the customer for approval before completing the transaction; and
 processing the transaction on behalf of the merchant and the customer using the default payment option, and returning to the merchant an approval code associated with the transaction without transferring any of the personal payment information associated with the customer to the merchant.

18. The system of claim 1, wherein the proxy presents the wallet to the customer for selecting a payment option for the transaction if the proxy device determines that the customer has not designated the default payment option.

* * * * *